United States Patent
Karns et al.

(10) Patent No.: US 10,600,525 B1
(45) Date of Patent: Mar. 24, 2020

(54) GAS PERMEABLE HYDROPHOBIC MATERIAL

(71) Applicant: Los Alamos National Security, LLC, Los Alamos, NM (US)

(72) Inventors: Tristan M. Karns, Los Alamos, NM (US); Brian L. Scott, Los Alamos, NM (US); Laura E. Wolfsberg, Los Alamos, NM (US); Paul H. Smith, Los Alamos, NM (US); D. Kirk Veirs, Los Alamos, NM (US); Kirk Reeves, Los Alamos, NM (US); Jared W. Borrego, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 15/841,078

(22) Filed: Dec. 13, 2017

Related U.S. Application Data

(60) Provisional application No. 62/437,567, filed on Dec. 21, 2016.

(51) Int. Cl.
| | |
|---|---|
| *G21F 5/06* | (2006.01) |
| *B01D 39/20* | (2006.01) |
| *G21F 1/12* | (2006.01) |
| *G21F 5/005* | (2006.01) |
| *G21F 5/02* | (2006.01) |

(52) U.S. Cl.
CPC ............. *G21F 5/06* (2013.01); *B01D 39/20* (2013.01); *G21F 1/125* (2013.01); *G21F 5/005* (2013.01); *G21F 5/02* (2013.01); *B01D 2239/0478* (2013.01); *B01D 2239/10* (2013.01); *G21Y 2002/10* (2013.01); *G21Y 2002/306* (2013.01); *G21Y 2002/501* (2013.01); *G21Y 2004/10* (2013.01)

(58) Field of Classification Search
CPC ... G21F 5/06; G21F 5/02; G21F 5/005; G21F 1/125; B01D 39/20; B01D 2239/0478; B01D 2239/10; G21Y 2002/501; G21Y 2002/306; G21Y 2002/10; G21Y 2004/10
USPC .................... 250/505.1, 506.1, 518.1, 517.1
See application file for complete search history.

(56) References Cited

U.S. PATENT DOCUMENTS

| | | | | |
|---|---|---|---|---|
| 4,957,522 A | * | 9/1990 | Brassell | B01D 39/00 55/385.4 |
| 5,353,949 A | * | 10/1994 | Seibert | B01D 46/0094 220/371 |
| 5,727,707 A | * | 3/1998 | Wickland | B65D 51/1616 220/288 |
| 6,619,499 B1 | * | 9/2003 | Lin | B65D 51/1616 215/308 |
| 2008/0017644 A1 | * | 1/2008 | Wickland | G21F 5/12 220/319 |

OTHER PUBLICATIONS

Azimi, et al "Hydrophobicity of rare-earth oxide ceramics," Nature Materials, 12:315-320, Apr. 2013.*

(Continued)

*Primary Examiner* — Michael Maskell
(74) *Attorney, Agent, or Firm* — Klarquist Sparkman, LLP

(57) ABSTRACT

Hydrophobic filter materials, methods of making them, and their use in various industrial applications are presented. In an example, thermally stable, gas permeable hydrophobic filters which maintain their integrity upon exposure to elevated temperature, radiation, acid, or all are described.

7 Claims, 38 Drawing Sheets

(56) References Cited

OTHER PUBLICATIONS

Zhang, et al ("Facile synthesis, growth mechanism and reversible superhydrophobic and superhydrophilic properties of non-flaking CuO nanowires grown from porous copper substrates" Nanotechnology 24(6):065602 (13 pages) Jan. 2013 (Year: 2013).*

Barthwal et al., "Superhydrophobic and Superoleophobic Copper Plate Fabrication using Alkaline Solution Assisted Surface Oxidation Methods," *International Journal of Precision Engineering and Manufacturing* 13(8):1311-1315, 2012.

Chaudhary et al., "Nanometric multiscale rough CuO/Cu(OH2 superhydrophobic surfaces prepared by a facile one-step solution immersion process: transition to superhydrophilicity with oxygen plasma treatment," *The Journal of Physical Chemistry C* 115(37):18213-18220, Aug. 2011.

Devaprakasam et al., "Boundary lubrication additives for aluminium: A journey from nano to macrotribology," *Tribology International* 38(11-12):1022-1034, 2005.

Haensch et al., "Chemical modification of self-assembled silane based monolayers by surface reactions," *Chemical Society Review* 39:2323-2334, 2010.

Karge et al., "Zeolites as Catalysts, Sorbents and Detergent Builders—Applications and Innovations," *Studies in Surface Sciences and Catalysis* 46:131-132, 1989.

Kieffer, "Thermodynamics and Lattice Vibrations of Minerals: 2. Vibration Characteristics of Silicates," *Reviews of Geophysics and Space Physics* 17(1):20-32, Feb. 1979.

Kopani et al., "FT IR spectroscopy of silicon oxide layers prepared with perchloric acid," *Applied Surface Science* 269:106-109, Mar. 15, 2013.

McHale et al., "Contact-angle hysteresis on superhydrophobic surfaces," *Langmuir* 20(23):10146-10149, Oct. 2, 2004.

Raza et al., "A colloidal route to fabricate hierarchical sticky and non-sticky substrates," *Journal of Colloid and Interface Science* 385(1):73-80, Nov. 1, 2012.

Schlup et al., "Nuclear Magnetic Resonance Investigation of Fluorinated Oxide Catalysts," *Journal of Catalysis* 99(2):304-315, Jun. 1986.

Ulman, "Formation and Structure of Self-Assembled Monolayers," *Chemical Reviews* 96(4):1533-1554, 1996.

Xu et al., "Synthesis of sillimanite whiskers," *Ceramics International* 41(8):10304-10307, Sep. 2015.

Yoshimitsu et al., "Effects of Surface Structure on the Hydrophobicity and Sliding Behavior of Water Droplets," *Langmuir* 18:5818-5822, 2002.

Zhang et al., "Facile synthesis, growth mechanism and reversible superhydrophobic and superhydrophilic properties of non-flaking CuO nanowires grown from porous copper substrates," *Nanotechnology* 24(6):065602 (13 pages), Jan. 2013.

* cited by examiner

| Element-Number | Element-Symbol | Element-Name | Confidence | Concentration | Error |
|---|---|---|---|---|---|
| 13 | Al | Aluminium | 100.0 | 17.9 | 0.1 |
| 14 | Si | Silicon | 100.0 | 13.3 | 0.1 |
| 8 | O | Oxygen | 100.0 | 61.1 | 0.2 |
| 46 | Pd | Palladium | 50.0 | 2.0 | 0.3 |
| 6 | C | Carbon | 100.0 | 1.4 | 0.8 |
| 79 | Au | Gold | 100.0 | 2.6 | 1.1 |
| 7 | N | Nitrogen | 100.0 | 1.7 | 1.7 |

GAS PERMEABLE HYDROPHOBIC MATERIAL

CROSS REFERENCE TO RELATED APPLICATIONS

This application claims the benefit of the Dec. 21, 2016, earlier filing date of U.S. provisional patent application No. 62/437,567 under 35 U.S.C. § 119(e). U.S. provisional patent application No. 62/437,567 is incorporated herein by reference in its entirety.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The present disclosure concerns gas permeable hydrophobic materials for use in various industrial applications, such as thermally stable, gas permeable hydrophobic filter materials for material storage containers that maintain performance integrity upon radiation exposure, acid exposure, or both.

BACKGROUND

Safe and effective storage and transportation of radiological materials and waste is a complex and important process. The Department of Energy has instituted procedures to protect workers who handle nuclear material from exposure due to loss of containment of stored materials. These procedures specify, inter alia, requirements for nuclear container design and performance.

One example of a nuclear material storage system is the SAVY™-4000 container developed by Los Alamos National Laboratory. These containers employ filters that capture radioactive particulates and vent hydrogen produced by radiolytic processes within the container. Facility and transportation accident scenarios, including impacts, fire, and subsequent water spray or flooding conditions, can compromise the performance of such filter materials or cause the filter to fail. Conventional filters do not satisfy the DOE regulations regarding fire safety. Conventional filters generally are made from hydrophobic carbon composites or organic polymers that fail at relatively low temperatures. For example, current filters fail at 170° C., whereas the DOE desires a 500° C. failure temperature in the event of a fire. New hydrophobic filter materials are therefore required to enhance resistance to fire and radiation damage and to minimize water ingress.

SUMMARY

Certain disclosed embodiments concern gas permeable inorganic materials with hydrophobic properties that maintain or exceed certain performance criteria for particulate filtration efficiency, pressure differential, air flow and hydrogen diffusion under elevated temperatures. These materials may be useful for multiple industrial applications, including for use as filters in nuclear storage containers.

A porous material comprising a substrate, such as a copper and/or aluminosilicate substrate, and a coating, such as a fluoride or fluorine coating, is disclosed. These materials are hydrophobic and stable when exposed to heat testing as discussed herein. For example, certain disclosed embodiments have a water contact angle of 100° to 160° and a failure temperature of greater than 350° C., more typically between 400° C. and 500° C. Also disclosed are compositions comprising $x(Al_2O_3)y(SiO_2)$ and fluorine, wherein x and y are each between about 1 and about 10.

A material storage container that includes filters comprising such porous materials is disclosed. Containers can include multiple filters, such as 3 filters in a stack. For these embodiments, filters in a middle layer are largely unaffected by the heat treatment tests discussed herein.

A method for using disclosed embodiments of the porous material, composition, or container also is disclosed. The materials and container comprising the materials are particularly useful for storing and/or transporting hazardous material.

A process for preparing a porous material comprising a copper and/or aluminosilicate substrate and fluorine or fluoride also is disclosed. One disclosed process embodiment comprises heating an aluminosilicate substrate at an effective temperature to form desired compounds, and exposing the aluminosilicate substrate to a perfluorosilane. For certain embodiments the effective temperature was at least about 500° C. and the perfluorosilane was a solution comprising perfluorooctyltrichlorosilane. The aluminosilicate substrate also may be cured.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent with color drawings will be provided by the Patent and Trademark Office upon request and payment of the necessary fee.

DETAILED DESCRIPTION

I. Introduction

Figure 1:
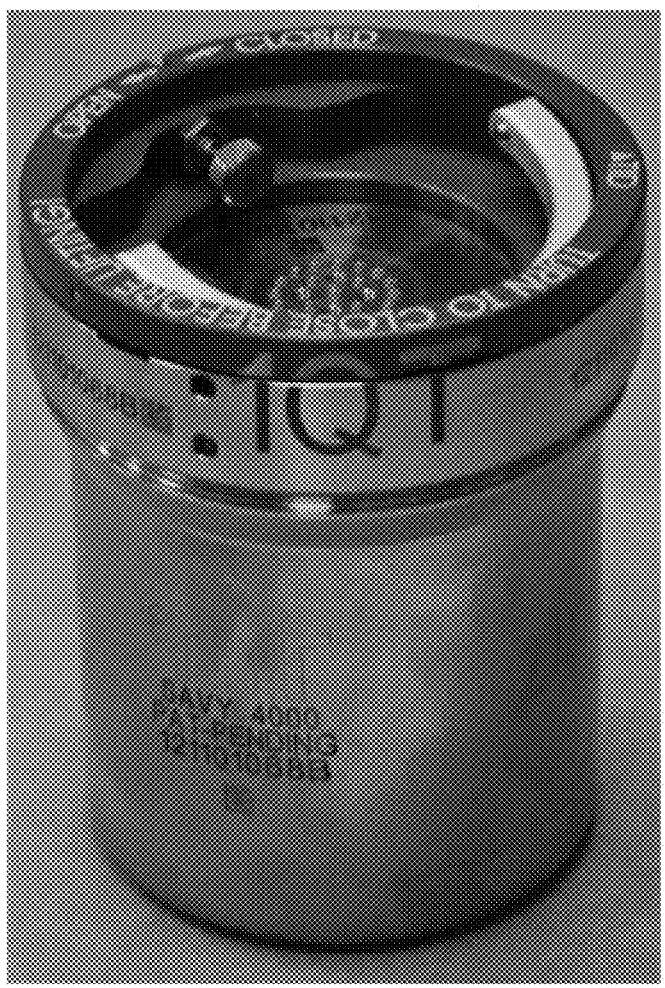
FIG. 1 is a photograph of a commercially available SAVY™-4000 storage container that includes an organic-based filter in its lid.

Disclosed herein are hydrophobic inorganic filter materials, typically halogenated filter materials, such as fluorinated inorganic filter materials, having improved stability properties compared to conventional organic-based materials, such as polytetrafluoroethylene (PTFE) membranes and carbon fibers. The disclosed filter materials can be used for a variety of industrial applications, such as filter material for a nuclear material storage container. The disclosed inorganic filter materials exhibit a minimal change, such as less than about a 10% change, in their aerosol filtration and/or water permeability properties after being exposed to conditions, such as high temperature, acid and/or radiation conditions, for at least about 1 hour. Organic-based conventional filter materials are destroyed by fire and also may be susceptible to radiation damage. Reducing or eliminating organic elements of conventional filters provides a safer containment container in the case of fire and high radiation environments. The disclosed inorganic filter materials have hydrophobic character failure temperatures substantially higher than conventional filter materials, are therefore substantially better at preventing water ingress into nuclear material storage containers (both inside and outside of gloveboxes), particularly at temperatures above 350° C. and up to at least 475° C., and thereby mitigate the risk of a criticality accident if fire suppression water is released.

Certain disclosed embodiments concern treating metals, metal oxides and/or metal silicates, such as copper, copper oxide and/or aluminosilicates, with a halogenating agent, such as a perfluorosilane or a fluoride salt. This process produces materials that can be configured as filters suitable for replacing conventional PTFE and organic-based filter materials.

II. Terms

Unless otherwise noted, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises."

All percentages recited herein concerning amounts of materials are weight percentages unless indicated otherwise.

All numerical ranges given herein include all values, including end values (unless specifically excluded) and intermediate ranges.

Unless otherwise indicated, all numbers expressing quantities of components, molecular weights, percentages, temperatures, times, etc., as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Although methods and materials similar or equivalent to those described herein can be used in the practice or testing of the present disclosure, suitable methods and materials are described below. The materials, methods, and examples are illustrative only and not intended to be limiting.

When organic chemical structures are depicted or described, unless explicitly stated otherwise, all carbons are assumed to include hydrogen so that each carbon conforms to a valence of four. For example, in the structure on the left-hand side of the schematic below there are nine hydrogen atoms implied. The nine hydrogen atoms are depicted in the right-hand structure.

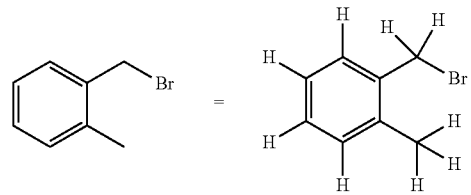

Sometimes a particular atom in a structure is described in textual formula as having a hydrogen or hydrogen atoms, for example —$CH_2CH_2$—. It will be understood by a person of ordinary skill in the art that the aforementioned descriptive techniques are common in the chemical arts to provide brevity and simplicity when describing organic structures.

The term "alkyl" refers to a hydrocarbon group having a saturated carbon chain. The chain may be cyclic, branched or unbranched. Examples, without limitation, include $C_{1-10}$ alkyl groups, such as methyl, ethyl, propyl, butyl, pentyl, hexyl, heptyl, octyl, nonyl and decyl.

The term "aluminosilicate" refers to a material comprising aluminum, silicon and oxygen, and may be a ceramic material. The chemical formula of an aluminosilicate is generally expressed as $x(Al_2O_3)y(SiO_2)$, and such aluminosilicates can be anhydrous or hydrated. In certain embodiments, x and y are each between about 1 and about 10, and certain embodiments concern aluminosilicate substrate materials comprising approximately equal parts alumina and silica. In some embodiments, the aluminosilicate substrate comprises fibers.

As used herein, the term "criticality accident" refers to the release of energy as a result of accidentally producing a self-sustaining or divergent chain reaction in a nuclear material.

The term "filter" refers to a porous medium that is used to separate out particulate, liquid and/or aerosol matter. As used herein, the terms "filter" and "filter element" may be used interchangeably, and may include only a single material or may be a combination of materials. For example, a filter may include a single layer of a hydrophobic inorganic material, such as an aluminosilicate fiber substrate comprising a fluorine of fluoride treatment to provide a coating, or it may comprise multiple layers of inorganic material, such as from 1 to 10 layers, including 2 to 9 layers, with certain working embodiments having 1 to 6 layers, such as from 1 to 3 layers. All of the plural layers may be hydrophobic, or only certain layers, such as the outer layers, may be hydrophobic.

A "haloalkyl" group is an alkyl group substituted with one or more of the same or different halogen atoms, e.g., $—CH_2C_1$, $—CF_3$, $—CH_2CF_3$, $—CF_2CF_3$, $—CH_2CCl_3$, and the like.

The term "silanization agent" refers to a chemical compound that is able to form a covalent O—Si—O bond with oxygen functionalities, such as a hydroxyl group, on a substrate material, such as an aluminosilicate substrate. A trihaloalkylsilane, wherein the alkyl group is a haloalkyl group, such as perfluorooctyltrichlorosilane (PFOTS), is one example of a silanization agent.

The term "stable" refers to a filter material that remains functional upon exposure to conditions such as increased temperature, acidity, radiation and/or water or water pressure. For example, the material retains its ability to filter an aerosol and resist water ingress at temperatures above ambient up to about 480° C. and/or pressures. In an embodiment, the change in aerosol filtration and/or water permeability is less than about 1%, less than about 5%, less than about 10%, or no more than about 10%, after the filter material has been exposed to such non-ambient conditions for 1 to 2 hours.

III. Storage Containers

Certain disclosed embodiments concern filters for use in containment devices, such as nuclear material storage containers. In an emergency situation, such as a fire, these containment devices may be subjected to high temperatures and direct flames, and the contained materials may be reactive with water. These containers must provide adequate worker safety in these situations.

Figure 2:
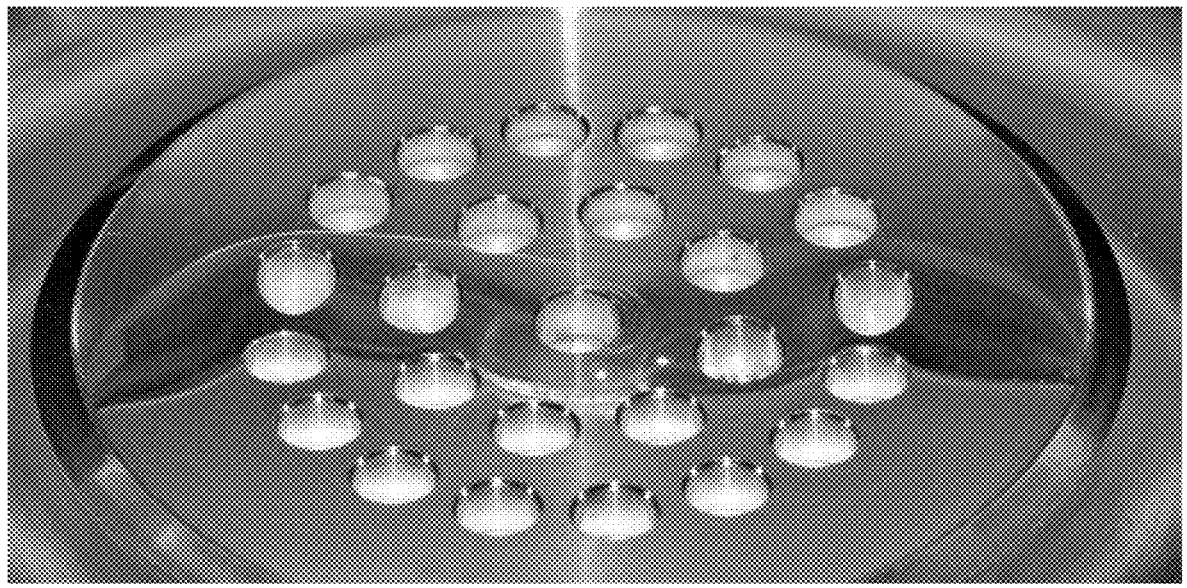
FIG. 2 is a photograph of the organic-based filter in the lid of the storage container shown in FIG. 1 after exposure to radiation.

FIG. 1 is a photograph of a SAVY™-4000 nuclear material storage container developed by Los Alamos National Laboratory and Nuclear Filter Technology, Inc. The lid fits tightly within a collar attached to the body. A leak tight seal is provided by radial compression of a soft O-ring positioned in a groove between the body collar and the lid. A single worker can open and close the container without using tools. The lid includes a gas permeable filter, or plural filters, primarily to prevent hydrogen build up inside the container and to prevent release of particulate nuclear material. The filter may be protected by a membrane that allows gases to pass but not liquids, such as water. FIG. 2 is an image of a SAVY™-4000 lid after being irradiated, showing liquid water on the filter.

Known containment devices typically use conventional, organic-based filter materials, including carbon fibers and PTFE, as the filter element in the container lid. Conventional SAVY™-4000 containers use a PTFE membrane on top of an aluminosilicate filter material (Fiberfrax 970J). The maximum normal operating temperatures for conventional organic-based filters are 70° C. for carbon fiber filters and 130° C. for PTFE membranes. These conventional materials (carbon fibers and PTFE) are quickly destroyed by fire and are susceptible to radiation damage when used inside a glovebox.

Figure 3:
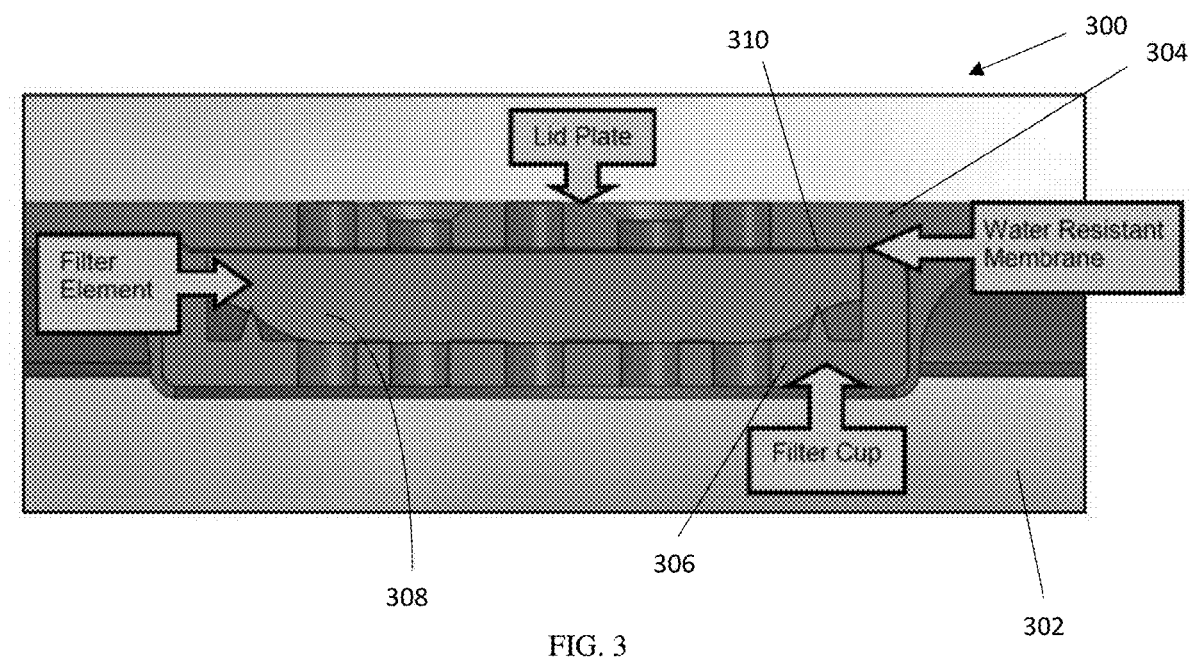
FIG. 3 is a cross-sectional schematic drawing of a storage container lid comprising a gas-permeable filter element.

FIG. 3 is a cross-sectional illustration of a container lid 300 comprising a body 302 and lid plate 304. Body 302 defines a filter cup 306 for receiving a filter material 308. For certain embodiments, the filter material may have a substantially circular or disc shape, and for use with SAVY™-4000 containers, the material may be cut using a die. For certain embodiments, the material was formed into a disc shape by cutting material with a 37 millimeter (1.46 inch) or a 41.275 millimeter (1.625 inch) die. The filter material 308 may be covered by a water resistant gas permeable membrane 310. Certain disclosed embodiments of the present invention concern inorganic filter materials that are gas permeable and hydrophobic to eliminate the need for housing two separate components in the container lid. The hydrophobic inorganic filter materials described herein form a water-tight and aerosol-tight seal in a nuclear material container, and may be retrofit to existing containers using an organic-based filter material.

Figure 4:
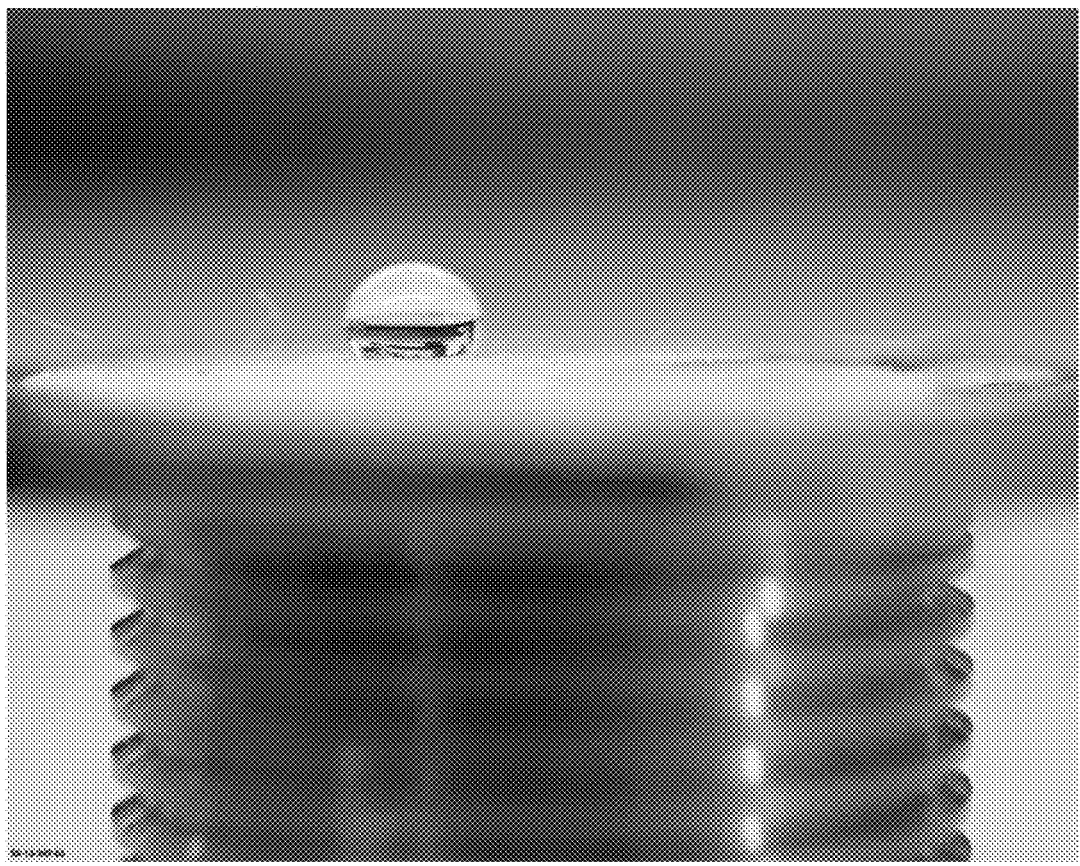
FIG. 4 is a side view image of a water droplet on an organic-based filter.

FIG. 4 is a side view image of a water droplet on a PTFE-containing filter (NucFil-013), which is similar to the filter used in the SAVY™-4000. In FIGS. 2 and 4, the contact angles of the water droplets on the filters indicate that the filters are hydrophobic.

Figure 5:
FIG. 5 is a photograph of a commercially available Hagan storage container that includes a conventional organic-based filter in its lid.
Figure 6:
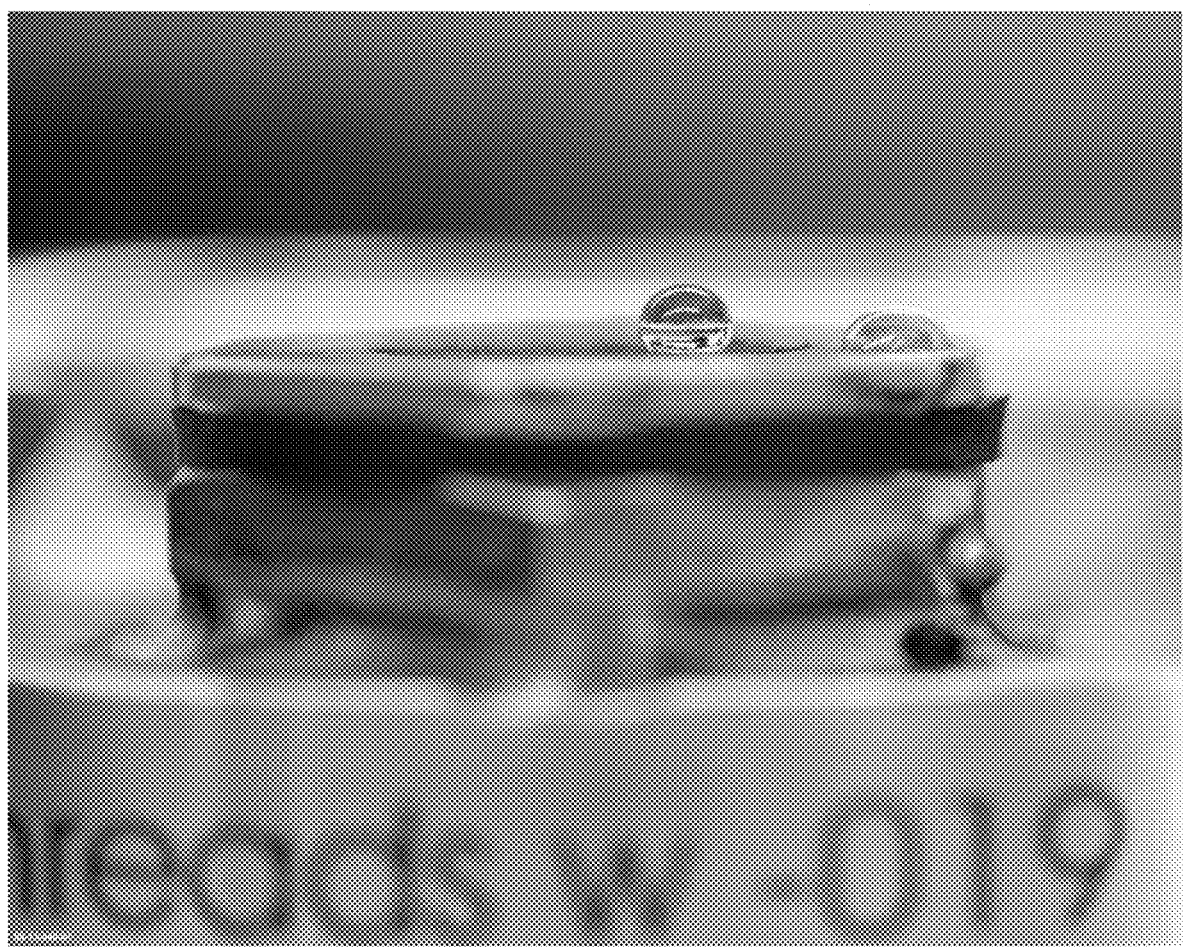
FIG. 6 is a side view image of water droplets on a filter (left droplet) and steel housing (right droplet) used in a Hagan storage container.

FIG. 5 is a digital image of a Hagan container, which is another example of a known container that includes a carbon fiber filter (NucFil-019) in its lid. The Hagen container does not contain any additional membrane as with the SAVY™-4000 lid; instead, its water resistance is due solely to the water resistant properties of carbon fibers. FIG. 6 is a side view image of water droplets on a NucFil-019 carbon fiber filter and on the stainless steel housing used in a Hagan container, showing very different contact angles. The surface of the carbon fiber filter is hydrophobic; the stainless steel housing is not as hydrophobic.

Figure 7:
FIG. 7 is an image of a Hagan storage container having an attached stainless steel water penetration fixture.

Certain disclosed embodiments concern new filter materials. These filter materials needed to be performance tested. FIG. 7 is a photograph of a Hagan container having a water penetration column fixture attached thereto. This test device allows testing filter material for water ingress at different water column heights. An additional modified container was designed to test disclosed hydrophobic inorganic filter material samples for their ability to resist water penetration, which was incorporated into a hard plastic fixture made using a 3D printer. For testing filter samples, a recess in the fixture was used to hold the filter material and a perforated plate was clamped on top of that to create a seal for both water and aerosol particles.

Water penetration test devices were used to test water ingress for both Hagan (carbon fiber filter) and SAVY™-4000 (aluminosilicate filter with a PTFE membrane) containers for a period of 2 hours with water pressures applied using water columns ranging from 12 inches to 60 inches. Water ingress test results are provided below in Table 1, and this data is presented graphically in FIG. 8.

TABLE 1

| Serial # | Container Size | Container Type | Height (in.) | Increase in Wt. (g) | Pre-Test Pressure Drop (in $H_2O$) | Post-Test Pressure Drop (in $H_2O$) |
|---|---|---|---|---|---|---|
| 08/07-967-019 | 5 Qt. | Hagan | 12.5 | 0.5 | 0.765 | Maxed |
| 09/06-634-013 | 5 Qt. | Hagan | 12 | 1.1 | 0.563945 | 4.396 |
| 08/02-719-013 | 5 Qt. | Hagan | 24 | 213.5 | 0.8709 | 26.762 |

TABLE 1-continued

| Serial # | Container Size | Container Type | Height (in.) | Increase in Wt. (g) | Pre-Test Pressure Drop (in H$_2$O) | Post-Test Pressure Drop (in H$_2$O) |
|---|---|---|---|---|---|---|
| 08/02-839-013 | 5 Qt. | Hagan | 18 | 14.8 | 0.704 | 18.73 |
| 09/06-520-013 | 5 Qt. | Hagan | 28 | 11.8 | 0.796 | 14.99 |
| 091205141L | 5 Qt. | SAVY | 13 | 21 | 0.653927 | Maxed |
| 071203144L | 3 Qt. | SAVY | 6.125 | 2.3 | 0.7136 | Maxed |
| 071203144L | 3 Qt. | SAVY | 60 | 3.5 | 0.7136 | 42.819 |
| 071203160L | 3 Qt. | SAVY | 60 | 0.7 | 0.6762 | 8.029 |
| 091205141L | 5 Qt. | SAVY | 60 | 188.9 | 0.683 | 42.819 |
| 011305006L | 5 Qt. | SAVY | 60 | 0.8 | 0.655709 | 4.4434 |
| 121103038L | 3 Qt. | SAVY | 60 | 1.9 | 0.7092 | 8.029 |
| 081305135L | 5 Qt. | SAVY | 60 | 1.7 | 0.585 | 26.76 |
| 111103029L | 3 Qt. | SAVY | 60 | 3.7 | | 37.47 |

Figure 8:
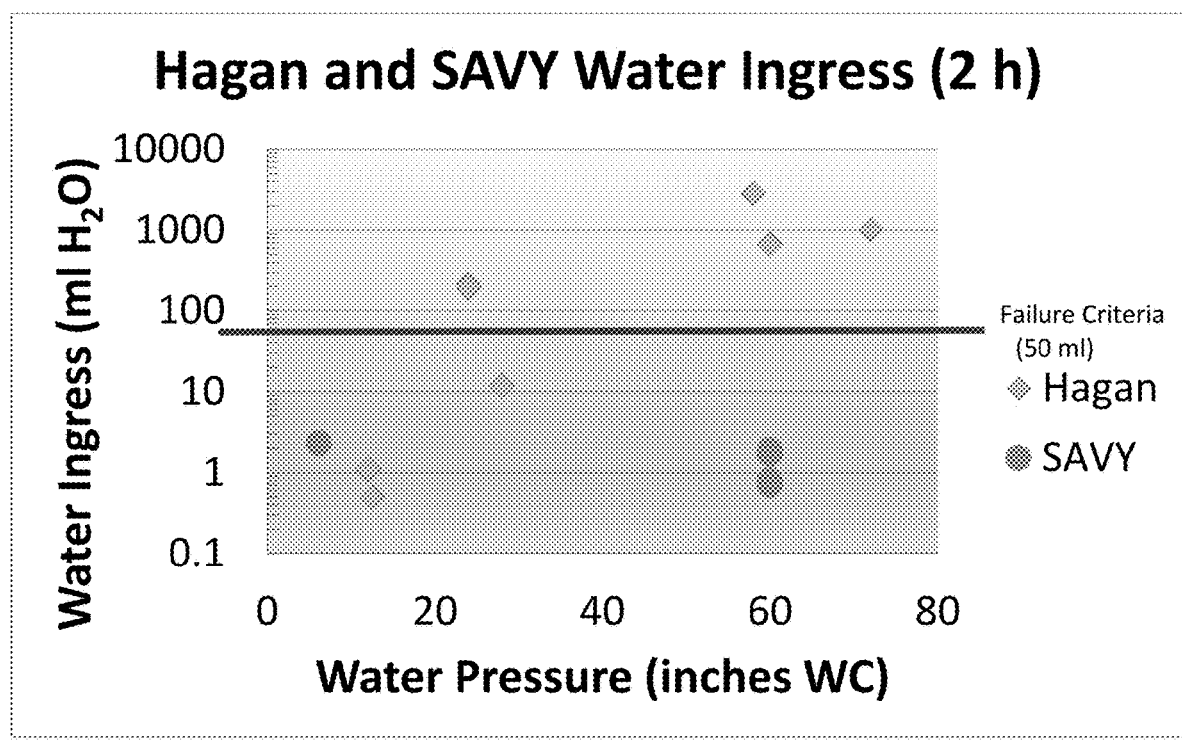
FIG. 8 is a graphical representation of water ingress (ml $H_2O$) versus water pressure (inches Water Column (WC)) data provided by Table 1.

FIG. 8 establishes that some measurable water ingress does occur under these test conditions for current design Hagan and SAVY 4000 containers at varying water pressures. Certain of the Hagan designs that were tested allowed water ingress substantially above the 50 milliliter amount set as the failure criteria.

IV. Filter Material Compositions

Certain disclosed embodiments concern inorganic hydrophobic materials that can be usefully employed as, for example, filter material formed into a filter shape or housed as material in a housing defined by a containment device lid. These materials may comprise a substrate material, such as a metal, a metal oxide, or a metal silicate. These materials also may be used in combination, such as at least one metal and at least one metal oxide, at least one metal and a metal silicate, a mixture of metal oxides, a metal oxide and a metal silicate, a mixture of metal silicates, and any combination thereof. The hydrophobicity of these substrate materials may be increased by treatment with a halogenating agent, with particular embodiments concerning treatment with fluorinating agents, to produce halogenated substrate materials with increased hydrophobicity relative to the non-halogenated substrate material.

For certain disclosed embodiments the substrate material was a metal, such as copper. Exemplary embodiments used copper foam and copper foil. Additional embodiments concern using substrate materials comprising metal oxides, such as ceria, alumina, silica, yttria, zirconia, as well as atomic and physical mixtures of these materials. Alumina silicates also are useful substrate materials. Aluminosilicate is generally expressed as x(Al$_2$O$_3$)y(SiO$_2$). In certain embodiments, x and y are each between about 1 and about 10, and certain embodiments concern aluminosilicate substrate materials comprising approximately equal parts alumina and silica. In some embodiments, the substrate comprises metal oxide and/or metal silicate fibers or nanowires.

Metal oxides, metal silicates, and mixtures thereof, may be calcined or un-calcined. For particular embodiments, calcined materials provided better structural integrity results. Materials may be calcined using any suitable calcining conditions, with certain embodiments calcining at temperatures of from about 500° C. to about 1000° C., with certain working embodiments calcining at temperatures at or about 1000° C. for a period of about 24 hours or less.

The hydrophobicity of the calcined or un-calcined substrate materials may be increased by treatment with a suitable hydrophobicity enhancing agent. Certain disclosed embodiments used halogenating agents to form halogenated substrate materials having enhanced hydrophobicity relative to the non-halogenated substrate starting materials.

Organic-based halogenating agents may be used, such as halosilanes, to associate the halosilane with the substrate. In certain embodiments the halosilane is covalently bonded to the substrate material. One example of a suitable halosilane reagent is 1H,1H,2H,2H-perfluorooctyl-trichlorosilane (PFOTS).

Organic-based halogenating reagents do provide increased hydrophobicity, but organic-based materials tend to decompose at lower temperatures than inorganic materials. Accordingly, certain disclosed embodiments concern using hydrophobicity enhancing agents that comprise inorganic materials. Certain working embodiments used fluoride salts, including ammonium fluoride, to create fluorinated aluminosilicates materials, such as AlF$_4$ structures on aluminosilicate substrates.

A series of filter material compositions were prepared and evaluated for their hydrophobicity and thermal stability as described below in more detail by the Examples. For example, CeO$_2$ films were prepared on yttrium-stabilized zirconia, lanthanum aluminum oxide, and aluminosilicate substrates.

Compositions also were prepared which incorporated metal, either as a base substrate (as foil or foam), or as a metal coating on a metal oxide or aluminosilicate substrate. Copper was used as an exemplary metal species. Certain of these compositions were also fluorinated with PFOTS. Samples of aluminosilicate substrates coated with PFOTS but without a copper coating were also prepared. The PFOTS-coated samples were hydrophobic and had improved thermal stability compared to both conventional PTFE membranes and uncoated substrate materials from which the fluorinated compounds were prepared. This provides a substantial advantage by increasing the time to failure in an accident scenario.

Inorganic halogenating agents, such as ammonium fluoride, also can be used. PFOTS degrades at temperatures above about 400° C. Fluorinated aluminosilicate compositions made using inorganic fluorinating agents may have higher failure temperatures than materials made using PFOTS.

The disclosed filter materials allow hydrogen and other gases to escape as they are generated in the SAVY containers. They also preclude radioactive particulates from escaping the container and prevent water from entering the container in the event of a fire in order to prevent possible contamination and criticality events.

The disclosed fluorinated materials are substantially hydrophobic as can be determined based on, for example, a suitable water contact angle, such as a contact angle of 120° or greater to at least 154°, such as 125° to 145°. Moreover, treated filters deterred water ingress provided by water column analysis. For example, treated 63% porous copper filter materials supported a 1 inch diameter column of water 36 inches high. The disclosed filter materials have higher failure temperatures than conventional materials, such as failure temperatures higher than 350° C., typically higher than 400° C., preferably higher than 425° C., even more preferably higher than 450° C., with certain disclosed embodiments having failure temperatures at least as high as 485° C. Notably, the inorganic filter materials disclosed herein can be readily incorporated into commercially available Hagan and SAVY containers.

V. Methods of Preparing and Using the Filter Material Compositions

Various methods of preparing disclosed filter materials were evaluated to identify efficient processes including the use of air-stable reagent mixtures. Metal oxide thin films, such as ceria ($CeO_2$) thin films, were synthesized using a polymer assisted deposition (PAD) technique by mixing the appropriate metal precursor with a polymer matrix containing polyethylenimine (PEI) and EDTA. The mixture was then filtered, spin coated onto a suitable substrate and then heated in air to drive off polymer and EDTA at approximately 450° C. These products were then fired at 1000° C. in air to form the metal oxide. Polycrystalline $CeO_2$ films on a yttrium-stabilized zirconia (YSZ) substrate were made using this process. Compositions comprising multiple metal oxide layers, such as 2 to 10 layers, may be made by repeating the process. For example, plural polycrystalline films of $CeO_2$ have been grown on lanthanum aluminum oxide (LAO). Polymer assisted deposition (PAD) has also been used to coat a fibrous aluminosilicate filter substrate (for example, Fiberfrax 970J, obtained from Unifrax) with ceria.

Metals surfaces have high melting points, and can be machined into various physical shapes that facilitate both use as a filter material and water runoff. Copper metal, used as an exemplary metal species, has a melting point of 1,085° C. Metal foil, metal foams, metal nanowires, and combinations thereof, are examples of forms of metal materials suitable for use with the present invention. Copper oxide nanowires can be made, for example, by heating copper to 550° C. for 24 hours.

Aluminosilicates can be calcined by heating for an effective period of time at a suitable temperature. Certain disclosed aluminosilicate embodiments were calcined by heating substrate materials for up to 24 hours at a temperature of from 600° C. to 1000° C., generally closer to 1000° C.

Metallized silicates also can be prepared, such as by sputter coating a selected metal onto the substrate material. The thickness of the applied coating also can be adjusted. Copper metal, for example, was sputter-coated onto 970-J Fiberfrax at six different thicknesses: 3 µm, 1 µm, 500 nm, 250 nm, 100 nm, and 50 nm. Prior to sputter-coating with copper, the aluminosilicate substrate was calcined by heating to 1000° C. for 4 hours.

Exemplary substrate materials have been halogenated by immersing a desired substrate, such as a metal, metal oxide and/or aluminosilicate substrate, in a suitable reagent solution. For example, exemplary copper and aluminosilicates embodiments were immersed in a solution of a perhalosilane, typically a perfluorosilane, such as 1H,1H,2H,2H-perfluorooctyl-trichlorosilane (PFOTS),

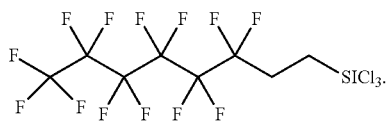

A person of ordinary skill in the art will appreciate that other halogenating agents could be used, and that the concentration of the fluorinating reagent solution can vary. But exemplary working embodiments typically have used 1 mM up to at least 10 mM PFOTS:hexane solutions. Increasing the PFOTS concentration and/or using multiple solution treatments, increased thermal performance. 10 mM solutions currently appear to provide the best results. Substrate materials may be immersed in compositions comprising the fluorinating reagent, for a suitable time, such as from 10 to about 30 minutes. Fluorinated materials can then be cured, such as by heating at 150° C. for 10 minutes. This process can be repeated as desired to apply multiple layers of the fluorinating reagent, such as applying from 2 to at least about 10 layers, more typically 2 to 6 layers. A currently preferred process comprises calcining an aluminosilicate substrate at 1000° C. for 4 hours, treating the calcined substrate with a 10 mM PFOTS solution for 30 minutes, rinsing the fluorinated substrate, such as with hexane, and then curing the fluorinated samples at 150° C. for 10 minutes.

Appropriate substrates can be fluorinated using an inorganic fluorinating agent, such as a fluoride salt. One example of a suitable fluoride salt is ammonium fluoride. An aluminosilicate substrate may be placed into an aqueous ammonium fluoride solution (such as a 5 mM to 10 mM solution) at ambient temperature for about 3 hours, after which excess solution is evaporated from the sample. Alternatively, the sample may be placed into an aqueous ammonium fluoride solution that is 5.5 weight percent fluoride for about 70 hours, to increase substrate fluorination. Again, the substrate materials may be calcined or not prior to either treatment. Other solvents may be used to make the ammonium fluoride solution, including non-aqueous solvents, such as alcohols.

Products having compositions that are processed according to the present invention are porous, hydrophobic filter materials. These materials have failure temperatures substantially higher than conventional materials and sufficiently high to be useful as containment container filter materials. Such materials generally have a porosity of greater than 60% up to at least 95%. For certain embodiments, the filter material is permeable to buildup gases, such as hydrogen, and yet capable of precluding particulate material from exiting or entering the containment device.

One method for quantifying hydrophobicity is to determine a material's water contact (WC) angle. A material having a contact angle smaller than 90° is generally considered hydrophilic, whereas a contact angle larger than 90° is considered hydrophobic. Accordingly, certain disclosed embodiments of the present invention concern inorganic porous materials having a contact angle of equal to or greater than 90° to at least 145°, typically greater than 90°, with many exemplary embodiments having a contact angle of from 100° to 140°, such as 120° to 135°. A water column testing apparatus also was used to further determine the degree of hydrophobicity of samples, as well as to determine the maximum amount of water that the filter could hold before ingress into the container. Water was pressurized against the filter sample placed in a sealed holder similar to that of a SAVY container. To be considered functional, each filter was tested under pressures calculated to be similar to 6 and 12 inches of water for dwell times of up to two hours, with no water seeping through the filter material. Prolonged water immersion tests also have been conducted for certain embodiments, establishing that (1) the treated samples were rendered hydrophobic, and (2) that such materials retained their hydrophobicity after prolonged water testing.

Suitable filter materials also maintain their structural integrity and hydrophobicity at "failure" temperatures substantially greater than conventional products, such as failure temperatures within a temperature range of from 400° C. to 485° C. A material is considered "heat stable" if it is functional and hydrophobic after being heated for 2 hours at a temperature within the 400° C. to 485° C. temperature range.

Aerosol filtration ability of the filters was tested using an oil droplet generator with an attached photometer for measurement. To be considered functional, filters were tested to ensure that they captured greater than 99.97% of 0.45 micron mean diameter dioctyl phthalate (DOP) aerosol at a rated flow of 200 cm³/min with a DOP concentration of 65±15 micrograms per liter. However, polyalphaolefin oil (POA) was used as a substitute in the oil droplet generator for this test to avoid the carcinogenicity of DOP. Aerosol concentration was measured via a photometer both upstream and downstream from the filter in question.

In certain embodiments, a filter is considered functional if it performs as well as an E11 HEPA class filter, which captures greater than 99.5% of airborne particles with a 0.3 micron mean diameter.

In certain embodiments, the filter material remains functional following exposure to alpha radiation and/or gamma radiation.

VI. Examples

The following examples are provided to illustrate certain particular features of disclosed embodiments. A person of ordinary skill in the art will appreciate that the scope of the invention is not limited to these particular features.

Sample Characterization.

Phenom Pro-X Scanning Electron Microscopy (SEM) photos were taken of certain samples just after cleaning with HCl, growing nanowires, after treatment with PFOTS, and after heating to the failure temperature. Phenom Pro-X Energy Dispersive Spectroscopy (EDS) data were also taken. Failure temperatures were determined by heating samples first at 200° C. for 1 hour, testing again for hydrophobicity by squirting 18.3 meg-ohm water on the cool surface and taking contact angle measurements, heating at 300° C. for 1 hour, testing for hydrophobicity, then heating at 400° C. for 1 hour. If the sample was still hydrophobic after 400° C., it was heated to 450° C. for 1 hour, tested, then heated to 550° C. for 2 hours.

Attenuated total reflectance infrared (ATR-IR) spectroscopy was used to analyze the surface chemistry of treated and untreated samples, and to help determine the mechanism of PFOTS binding to the substrate. A ThermoFisher Scientific Smart iTR diamond ATR-IR apparatus was zeroed using a background elimination feature, and was analyzed at a resolution of two, with 16 scans being completed for each set of data using ThermoFisher Scientific's OMNIC software. A spectrum was collected for uncalcined and calcined blank substrates, each sample after being treated, and each sample after failure. Spectra were analyzed and compared using OMNIC and Igor software.

X-ray diffraction (XRD) was used to characterize the crystalline phases present in the materials. Qualitative analyses were performed on the data using Jade9 v 9.7 (Materials Data Incorporated, Livermore, Calif.) software and the diffraction pattern library PDF4+(International Center for X-ray Diffraction, Newton Square, Pa.).

The filtration ability of the filters was tested using an oil droplet generator with attached photometer for measurement, as described. Aerosol concentration was measured via a photometer both upstream and downstream from the filter in question. Percentage of droplet penetration, as well as pressure drop across the filter, were also measured using the same system.

Example 1

$CeO_2$ thin films listed in Table 2 were synthesized using a polymer-assisted deposition (PAD) technique by dissolving metal in a polymer matrix comprising polyethylenimine (PEI) and EDTA. The mixture was then filtered, spin coated onto a single crystal substrate and then heated in air to drive off the polymer/EDTA at approximately 450° C. The resulting material was then fired at 1000° C. in air to form $CeO_2$.

TABLE 2

Data for $CeO_2$ Thin Films Grown on Various Substrates

| Sample | Substrate prep | Contact angle (°) |
| --- | --- | --- |
| $CeO_2$ on LAO, #1 | UV clean | 97 |
| $CeO_2$ on LAO, #2 | UV clean | 94 |
| $CeO_2$ on LAO, #3 | Sonicate in ethanol | 76 |
| Bare LAO | UV clean | <20 |
| $CeO_2$ on c-cut sapphire | UV clean | 60 |
| $CeO_2$ on YSZ, 1 coat | UV clean | 60 |
| $CeO_2$ on YSZ, 2 coat | UV clean | 40 |
| Bare YSZ | UV clean | <20 |

Figure 9:
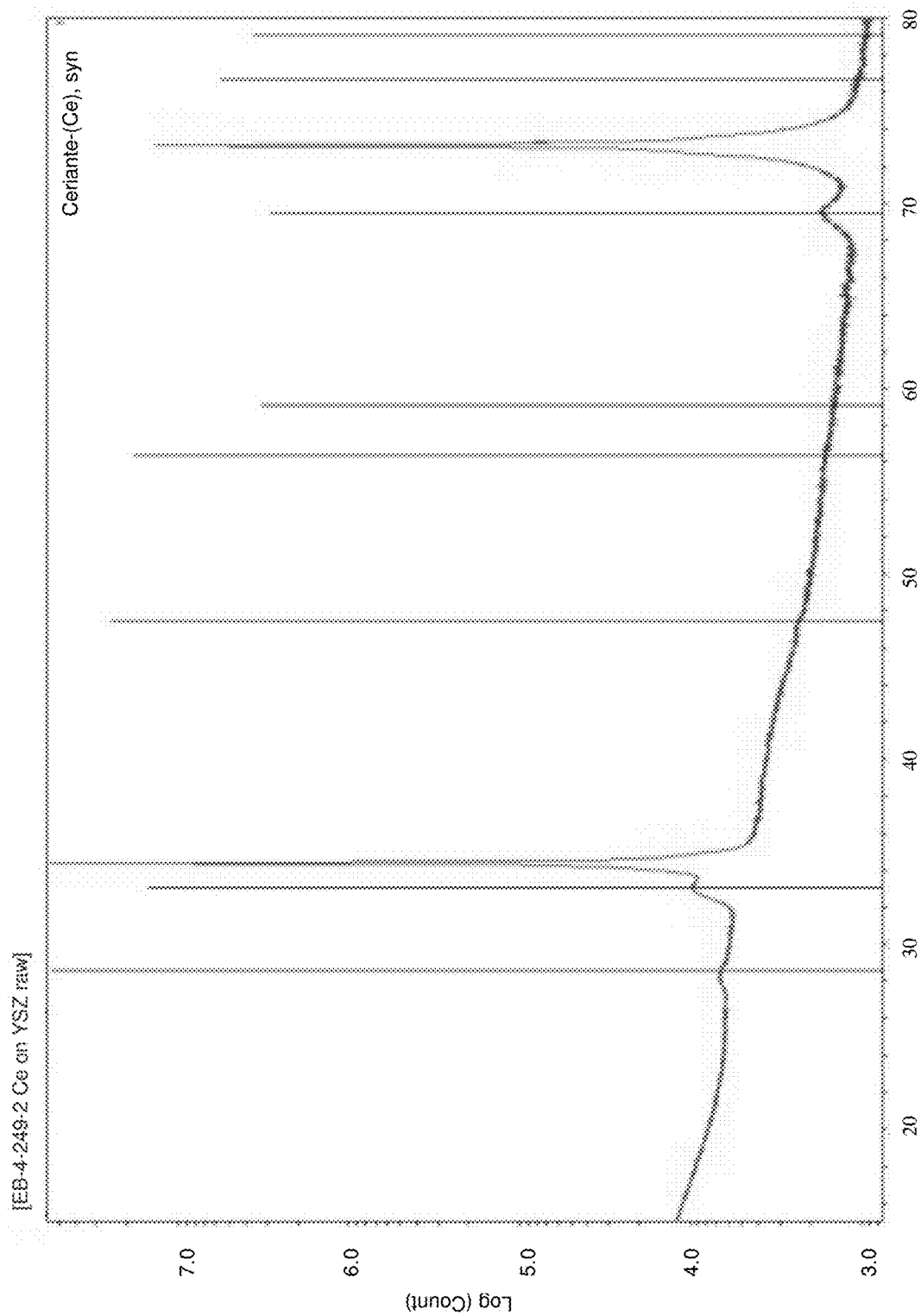
FIG. 9 provides x-ray diffraction data for an exemplary inorganic film on a yttrium-stabilized zirconia substrate.

Polycrystalline $CeO_2$ films on yttrium stabilized zirconia (YSZ) substrates were made using this process, as evidenced by x-ray diffraction (XRD) spectra. FIG. 9 is an XRD pattern showing ceria film peaks (red) matching with the predicted peak positions (black). The strong peaks in FIG. 9 are from the YSZ substrate.

Figure 10:
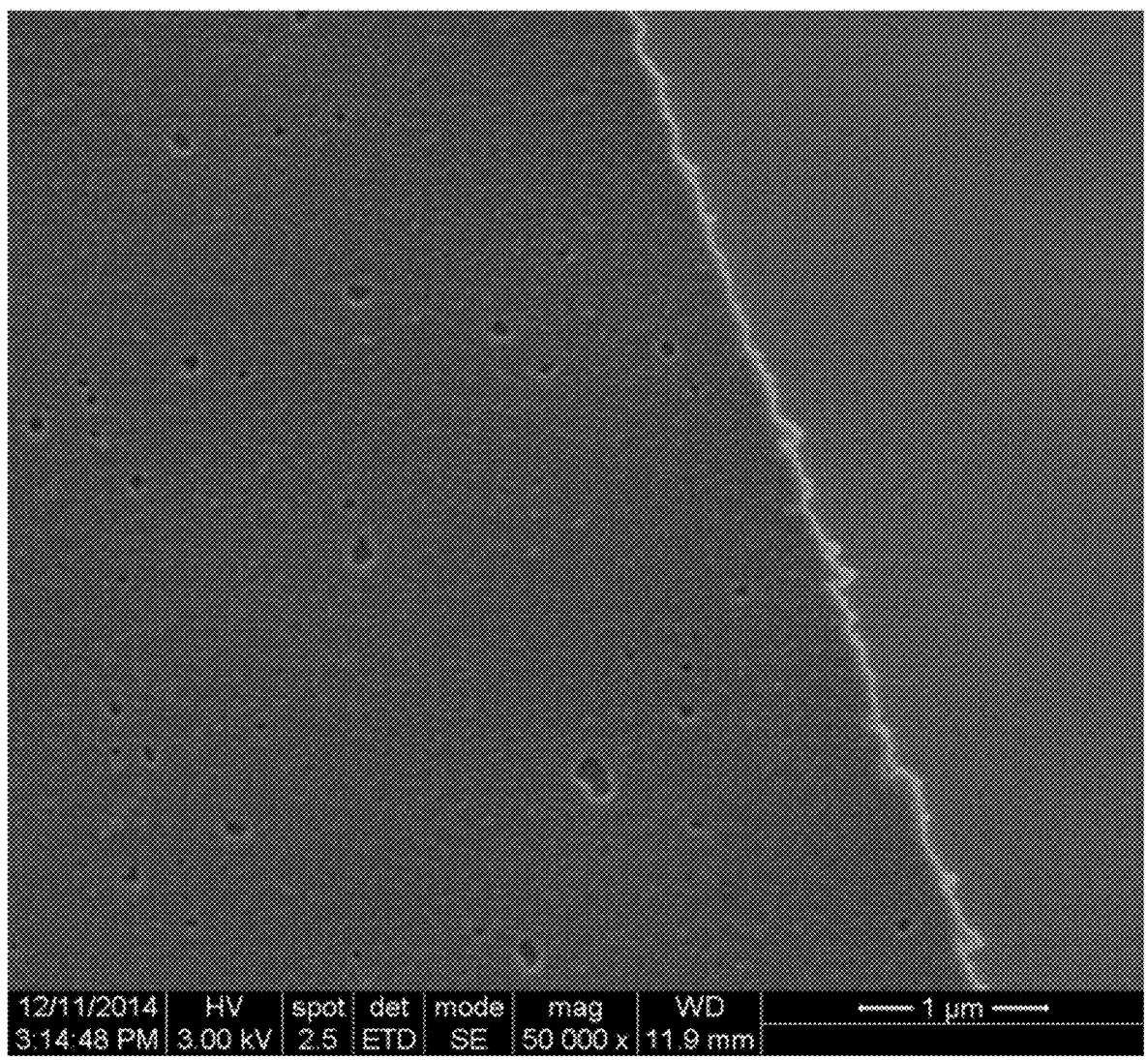
FIG. 10 is a scanning electron micrograph (SEM) of a single coat of the exemplary inorganic film of FIG. 9.

Scanning electron microscopy (SEM) was used to determine the surface structure of the $CeO_2$ films on YSZ. FIG. 10 is an SEM image (50,000× magnification) of a single coat of $CeO_2$ layered on YSZ, and holes in the film are visible. The uneven edge on the right side of the image is the boundary between the $CeO_2$ film (left) and the YSZ substrate (right). The contact angles of the film were determined to be about 60°, which is at a low end of what is considered hydrophobic.

A second layer of $CeO_2$ was coated on the first film. This second coat produced a product having a contact angle of only 40°.

Polycrystalline films of $CeO_2$ were then grown on lanthanum aluminum oxide (LAO). For a sample grown on a LAO substrate that was prepared using sonication instead of the UV cleaning used for samples #1 and #2, the contact angle only measured 76°. As also shown in Table 2, a $CeO_2$ film on c-cut sapphire gave a contact angle of 60°. However, the process also produced products having contact angles generally greater than 90°, indicative of strong hydrophobic character.

Example 2

The polymer-assisted deposition (PAD) technique described above can be used to form oxide films or substrates, such as rare earth oxide films on aluminosilicate substrates. For example, this process was used to coat a fibrous aluminosilicate filter substrate (Fiberfrax 970J, obtained from Unifrax) with ceria. The layered material was characterized with XRD, SEM, and water contact angles.

Aluminosilicate fibers present a different substrate structure for the growth of ceria films compared to the YSZ and LAO substrates. The latex binder used in the aluminosilicate Fiberfrax filter material was removed by heating before either spin-coating or rotary evaporation of the aluminosilicate. However, neither technique produced a hydrophobic coating on the aluminosilicate fibers, although XRD did show that a $CeO_2$ film was present. When a drop of water was placed on the treated materials it was immediately drawn into the filter material.

Example 3

Copper foil and foam substrates were fluorinated to determine whether the fluorinated materials were hydrophobic and/or thermally stable. Fluorination involved immersing the samples in a 1 mM PFOTS in hexane solution. Copper foil (99.9 wt % Cu, Goodfellow Corporation, 125 Hookstown Grade Road, Coraopolis, Pa. 15108-9302, USA) and porous copper foam pieces (Goodfellow, 99.9% wt % Cu, porosity 91% and 63%) were cleaned with 1M HCl for 30 seconds to two minutes to remove surface CuO, rinsed 3 times with 18.3 meg-ohm deionized water to remove HCl, heated to 550° C. for 24 hours in a tube furnace to grow CuO nanowires, immersed in 1 mM PFOTS in hexane for 30 minutes to fluorinate the surface, rinsed with hexane to remove excess PFOTS, and then cured at 150° C. for 10 minutes. PFOTS, hexane, and absolute ethanol were obtained from Sigma Aldrich Company; hydrochloric acid (HCl) was obtained from Fisher Scientific. The treated copper pieces, such as copper foams, had contact angles in the range of 120°-130°, indicative of a strongly hydrophobic material.

Figure 11:
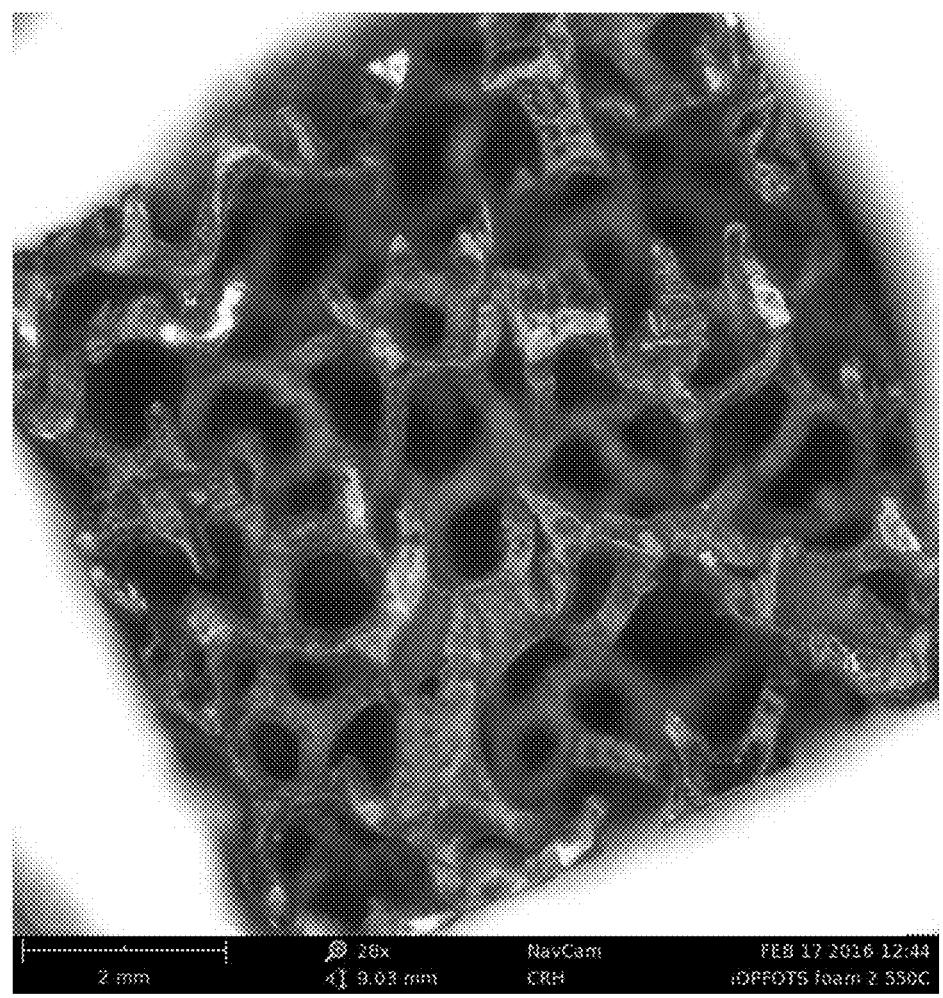
FIG. 11 is an image (28× magnification) of an exemplary 91% porosity copper foam substrate after heating to 550° C. for 2 hours rendering it non-hydrophobic.
Figure 12:
FIG. 12 is an image of a water droplet on a cubic sample of an exemplary 91% porosity copper foam substrate after treatment to render it hydrophobic.
Figure 13:
FIG. 13 is an image of an exemplary 91% porosity copper foam substrate after treatment rendering it hydrophobic, floating in water.
Figure 14:
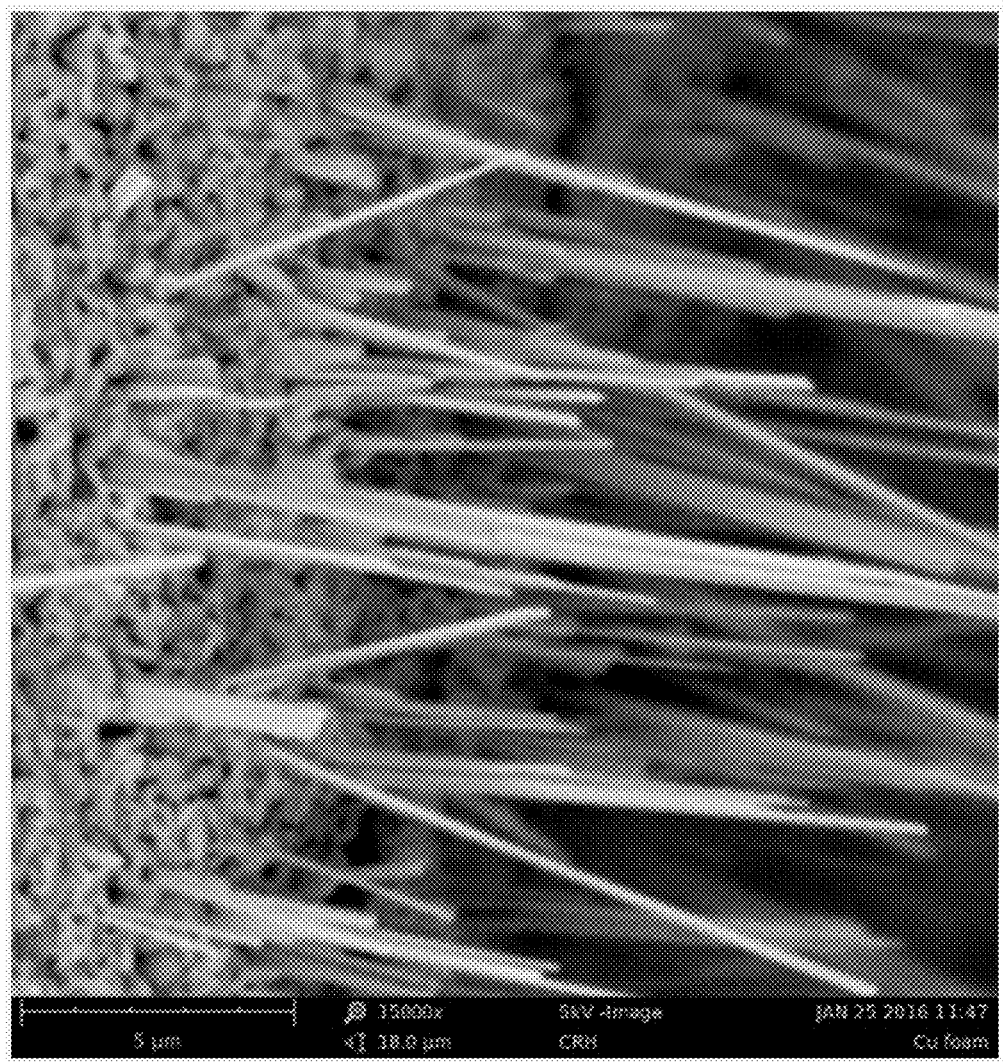
FIG. 14 is an SEM (15,000× magnification) showing the nanostructures present in an exemplary 91% porosity copper foam substrate after treatment to render it hydrophobic.

FIG. 11 is an image (28× magnification) of the 91% porosity copper foam after oxidation and fluorination. FIG. 12 is a photograph of the 91% porosity copper foam after oxidation and fluorination, with a water droplet on the top of the sample. The water droplet had a contact angle of about 120°-130°, establishing that the material was strongly hydrophobic. FIG. 13 is a photograph of the 91% porosity copper foam after oxidation and fluorination, in a beaker of water. The sample is resting on the surface of the water due to surface tension. FIG. 14 is an SEM of the 91% porosity copper foam after oxidation and fluorination, with nanostructures present, at a magnification of 15,000×.

Treated samples were then subjected to a 36 inch water column test. These tests established that the treated substrates were capable of preventing water ingress from a 36 inch water column. Tests also were performed to verify that the treated foam maintained gas permeability.

Figure 15:
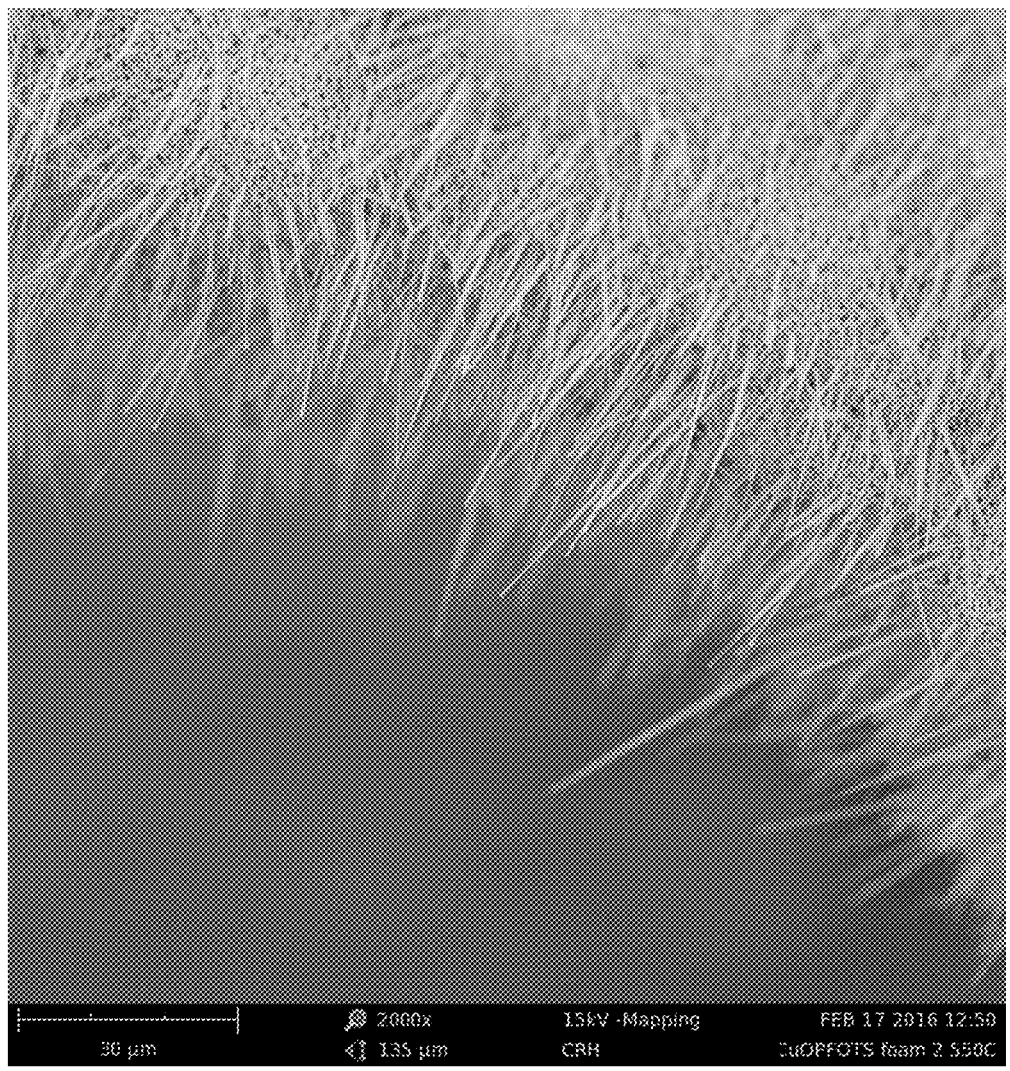
FIG. 15 is an SEM (2000× magnification) of an exemplary hydrophobic 91% porosity copper foam after heat treatment at 550° C. for 2 hours.
Figure 16:
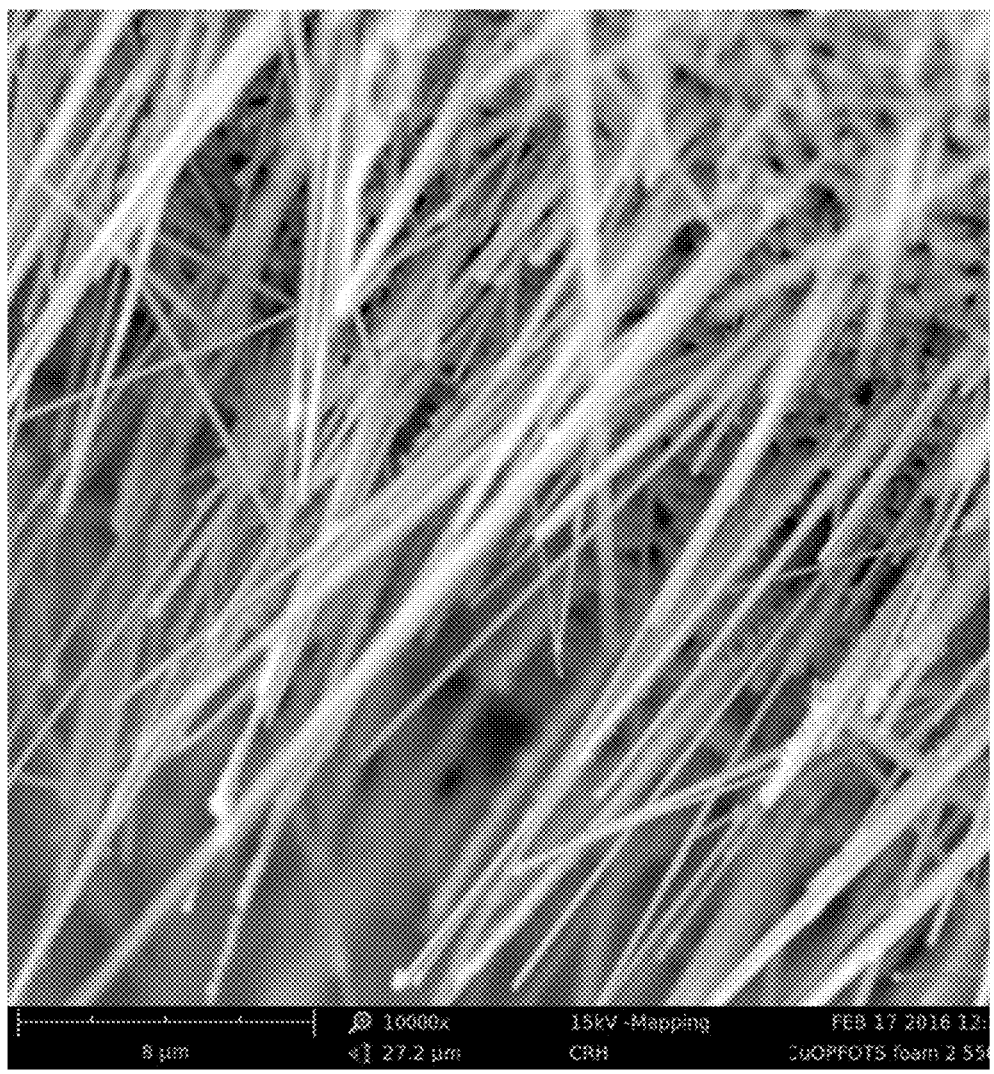
FIG. 16 is an SEM (10,000× magnification) of an exemplary non-hydrophobic 91% porosity copper foam after heat treatment at 550° C. for 2 hours.

Treated samples were then subjected to additional heat treatments. When additionally heated to 400° C. for 2 hours, the treated 91% porosity copper foam maintained its hydrophobicity. It was only after heating to 550° C. for 2 hours that the hydrophobicity was degraded, while the nanostructure density increased. FIG. 15 is an SEM of the oxidized and fluorinated 91% porosity copper foam after additional heat treatment at 550° C. for 2 hours, at a magnification of 2000×. FIG. 11 is an image of the oxidized and fluorinated 91% porosity copper foam after additional heat treatment at 550° C. for 2 hours, at a magnification of 28×. FIG. 16 is an SEM of the oxidized and fluorinated 91% porosity copper foam after additional heat treatment at 550° C. for 2 hours, at 10,000× magnification. Further heating led to more dense nanostructure growth.

Figure 17:
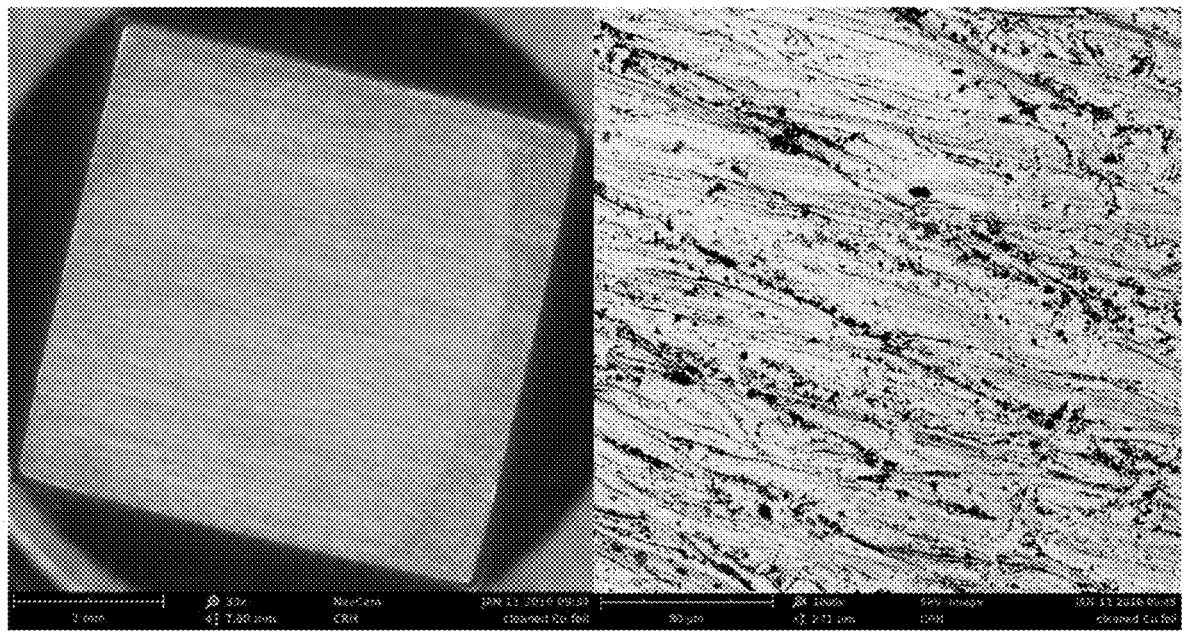
FIG. 17 provides images of a cleaned exemplary copper foil substrate that has not been fluorinated (33× magnification for left side image, and 1000× magnification for right side image).
Figure 18:
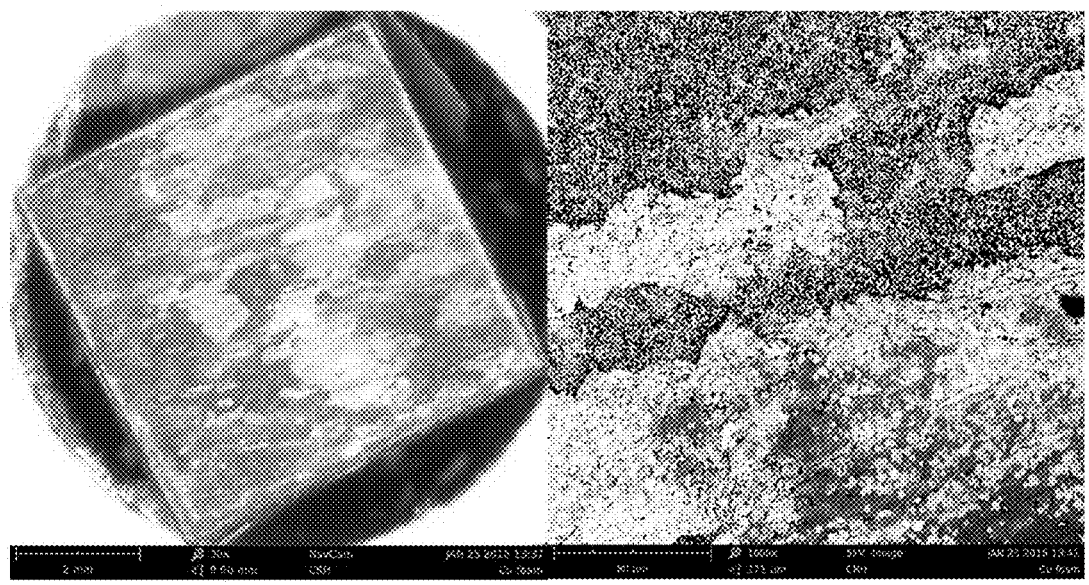
FIG. 18 provides images of an exemplary copper foil substrate that has been heated to 550° C. for 24 hours (30× magnification for left side image and 1000× magnification for right side image).

FIG. 17 provides images of a copper foil sample before oxidation and treatment with PFOTS. Clean copper foil is shown magnified 33× on the left, and 1000× magnification on the right. The darker region on the right hand image of the clean copper foil included crystals on the surface that are probably CuO that was not etched during the 30 second immersion in 1M HCl (left image). The lighter region of the copper foil did not contain as many of the CuO crystallites (right image). Subsequent samples were immersed for 1 to 2 minutes to facilitate etching residual CuO from the surface FIG. 18 provides images of copper foil after heating to 550° C. for 24 hours. Dark areas of CuO on the foil are visible in the 30× magnified image, left, and at 1000× magnification, right. After heating to 550° C. for 24 hours to grow nanowires, the CuO surface of the Cu foil peeled off in places, exposing bare copper metal surface.

Figure 19:
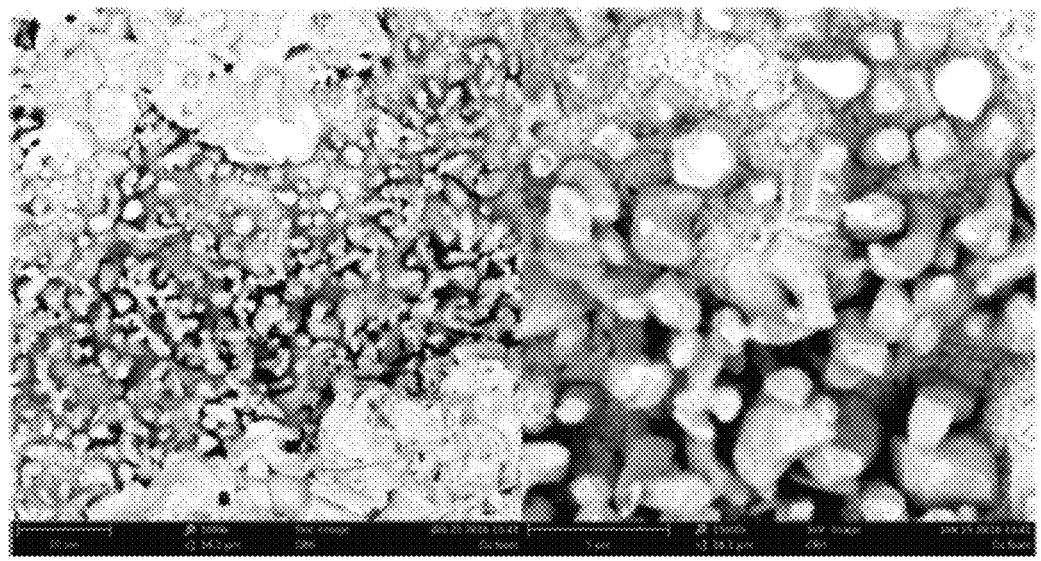
FIG. 19 provides additional images of the exemplary copper foil substrate of FIG. 18 (5000× magnification for left side image and 10,000× magnification for right side image).
Figure 20:
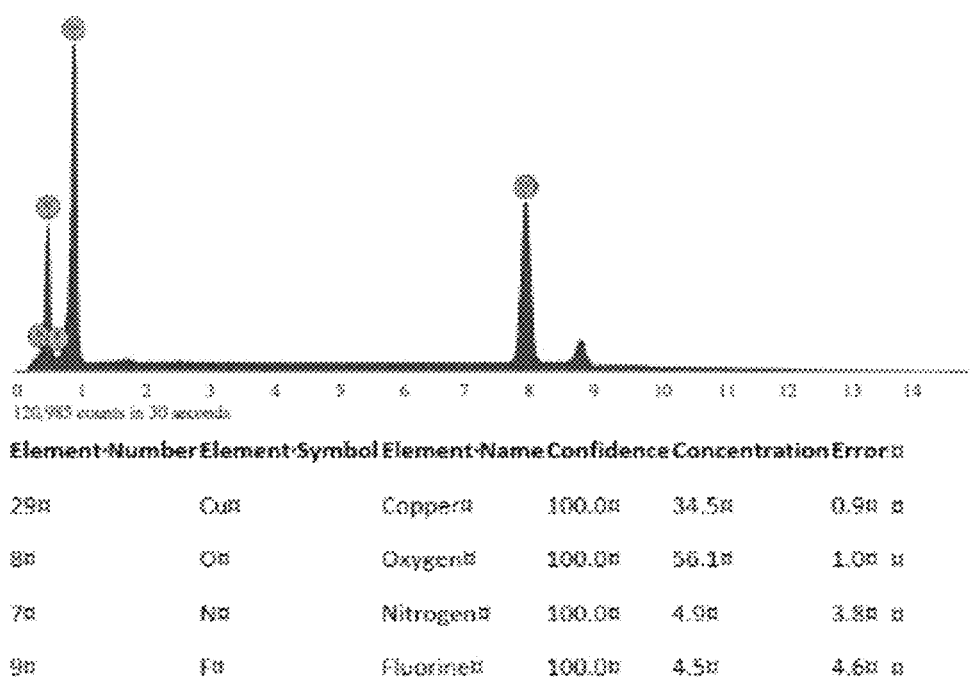
FIG. 20 is an EDS of an exemplary oxidized copper foil substrate, showing predominantly copper oxide with minor contaminants.

FIG. 19 provides additional images of copper foil after heating to 550° C. for 24 hours. CuO crystals are visible on the copper foil at 5000× magnification, left, and 10,000× magnification, right. FIG. 20 provides EDS results for oxidized copper establishing that copper oxide, with some minor contaminants, was produced by the process.

Figure 21:
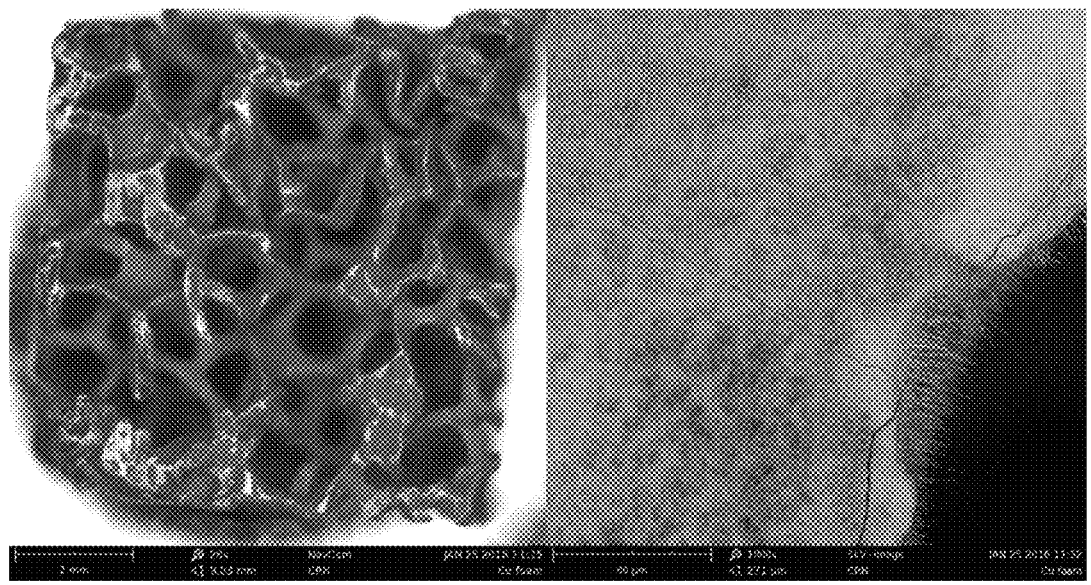
FIG. 21 provides images of an exemplary 91% porosity copper foam substrate that has been heated to 550° C. for 24 hours (28× magnification for left side image and 1000× magnification for right side image), showing presence of CuO nanowires.

FIG. 21 provides images of CuO nanowires on a sample of 91% porosity copper foam, left image (magnified 28×), and at 1000× magnification, right image. After heating the copper foam to 550° C. for 24 hours, CuO nanowires were produced on the surface.

Figure 22:
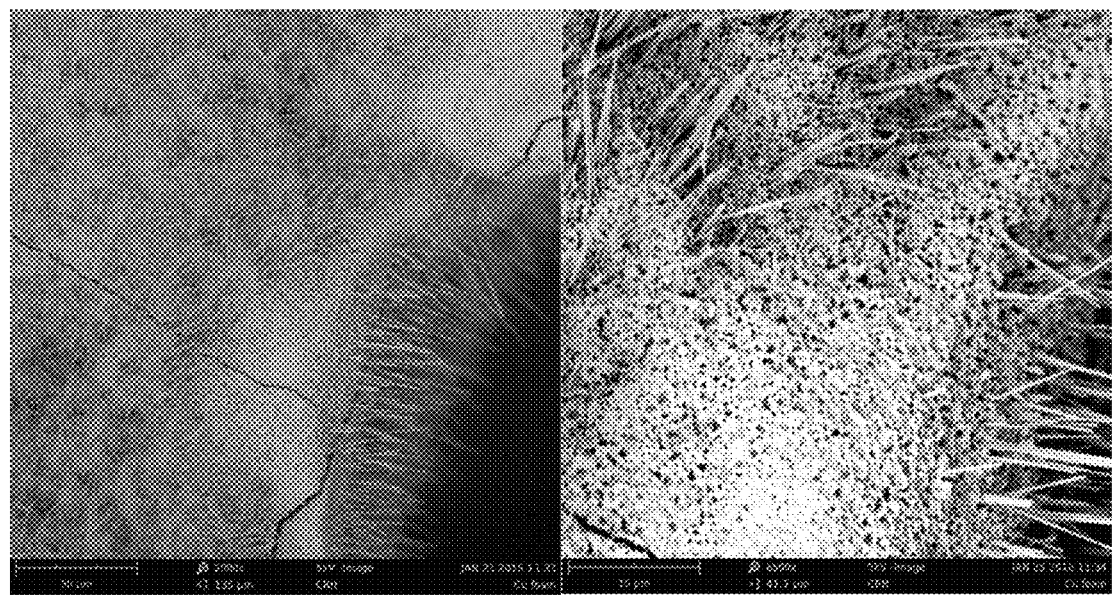
FIG. 22 provides additional images of the CuO nanowires formed on the substrate of FIG. 22 (2000× magnification for left side image and 6,500× magnification for right side image).
Figure 23:
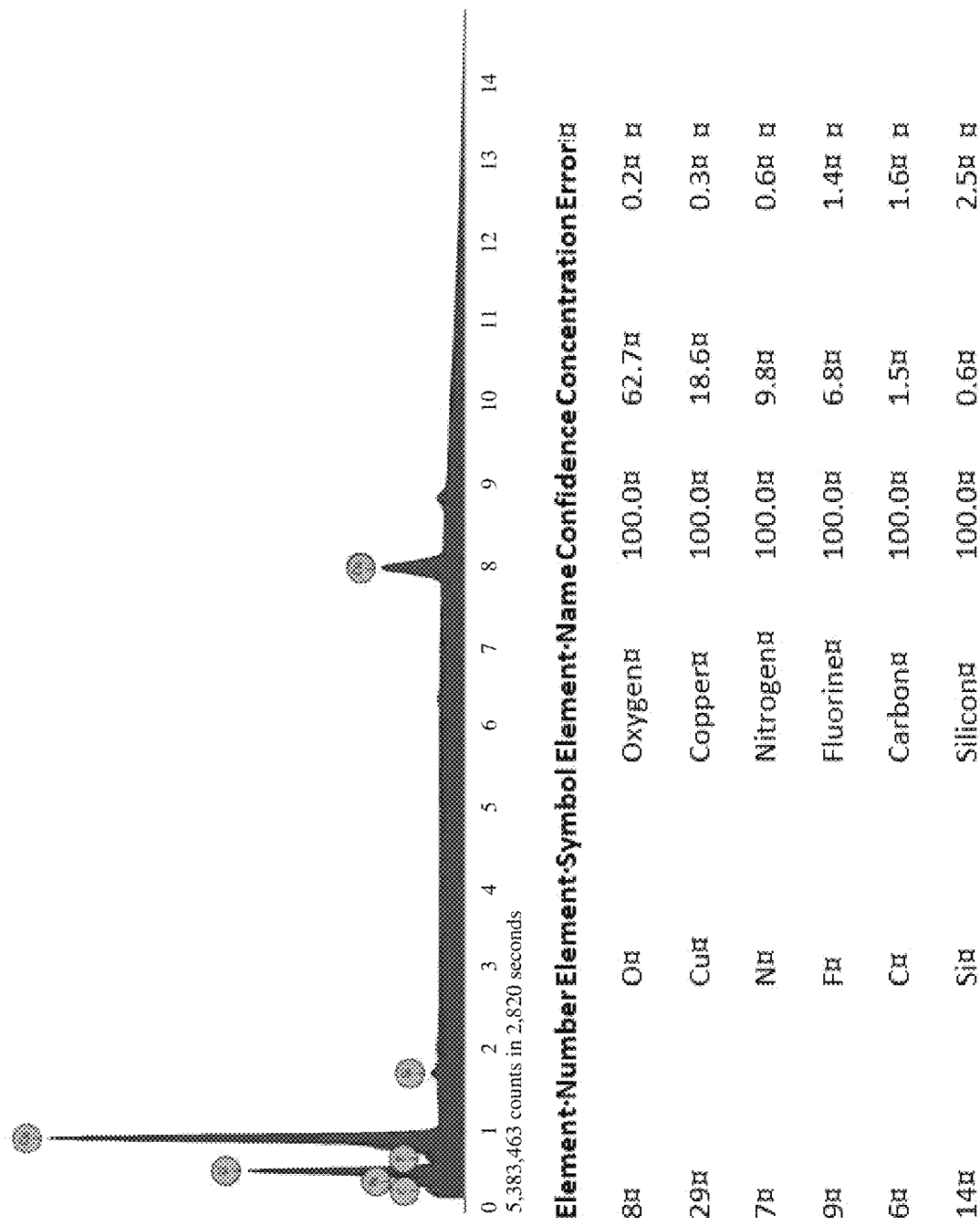
FIG. 23 is an EDS of an exemplary 91% porosity copper foam substrate that has been heated to 550° C. for 24 hours demonstrating that the foam substrate comprises a CuO nanowire coating.

FIG. 22 provides additional images of the CuO nanowires formed on 91% porosity copper foam after heating to 550° C. for 24 hours, at 2000× magnification, left, and 6500× magnification, right. FIG. 23 provides EDS results of a sample of 91% porosity copper foam with a CuO nanowire coating. Excess oxygen and nitrogen levels probably result from trapped surface air.

Both copper foil and foam became hydrophobic after heat processing and coating with PFOTS, with contact angles of 120° on average. The copper foil surface containing CuO nanowires flaked off after the oxidative heating to 550° C. for 24 hours (FIG. 18). Generally, the copper foam substrates did not flake, although some cracks were visible, and nanowires were apparent on most of the surfaces (as seen in FIGS. 21-25). Even after heating to 300° C., a PFOTS-coated 91% porosity copper foam sample was able to float on water, whereas an untreated 91% porosity copper foam piece of the same size, sank. The 63% porous copper disk was able to hold a one inch column of water 36 inches high for 1 minute. None of the copper foam samples were still hydrophobic after heating to 550° C. for 2 hours even though there were copious amounts of nanowires present, suggesting that the PFOTS decomposes or combusts. The EDS spectrum shows that the Si peak was much smaller after heating, and the C peak was absent (FIG. 20). Failure tests for copper foam materials showed a maximum failure temperature of about 450° C. The copper substrate materials received only one PFOTS coat at 1 mM concentration.

No SEM images or EDS data were taken for CuO foil and foams treated with PFOTS because sonication in organic solvents to remove the carbon tape used in those analyses could have potentially altered or removed the PFOTS. However, SEM images of samples after they have reached the failure temperature are shown in FIGS. 24-25.

Figure 24:
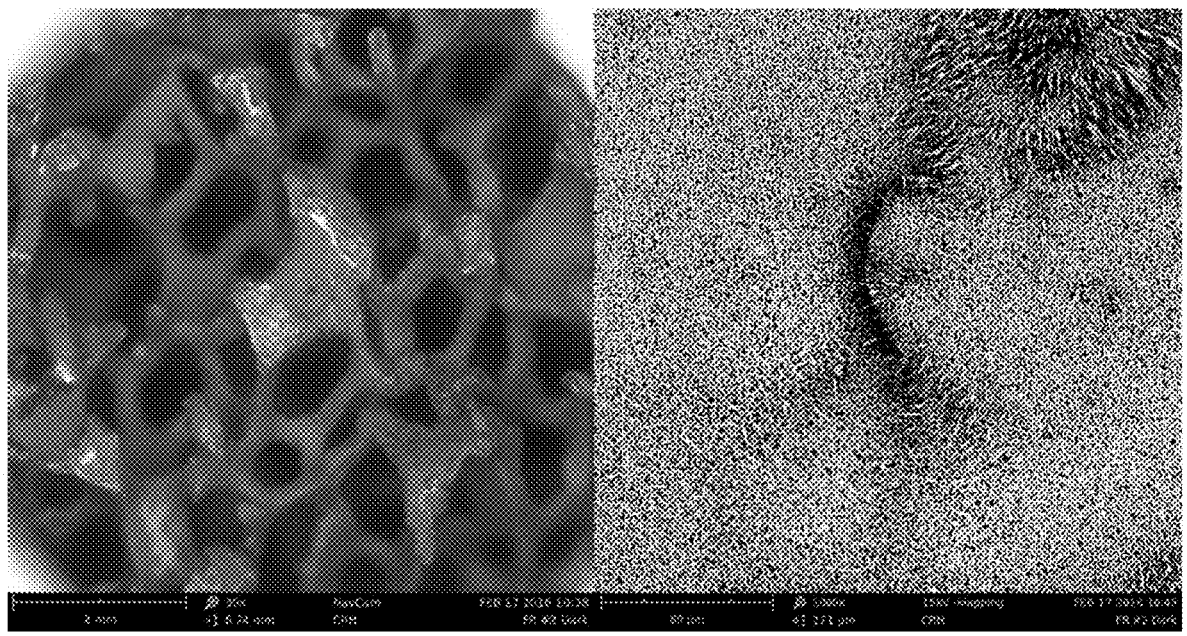
FIG. 24 provides images of an exemplary 91% porosity copper foam treated with perfluorooctyltrichlorosilane (PFOTS) after heating for 1 hour at 450° C. (39× magnification for left side and 1000× magnification for right side).
Figure 25:
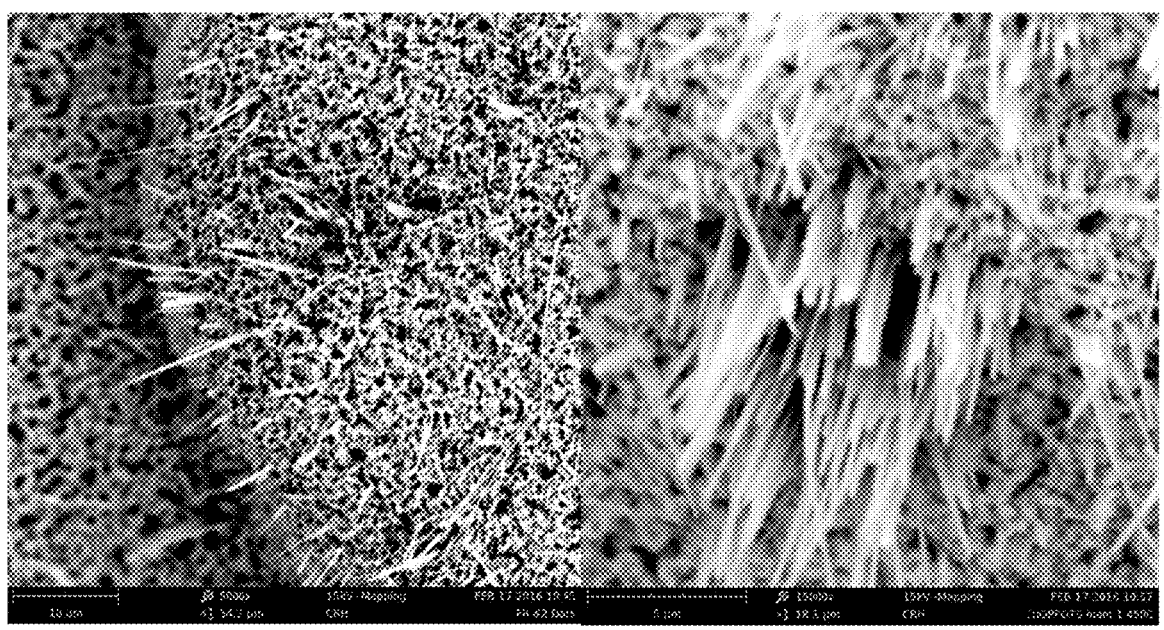
FIG. 25 provides additional images of the exemplary 91% porosity copper foam substrate of FIG. 24 (5000× magnification for left side image and 15,000× magnification for right side image).
Figure 26:
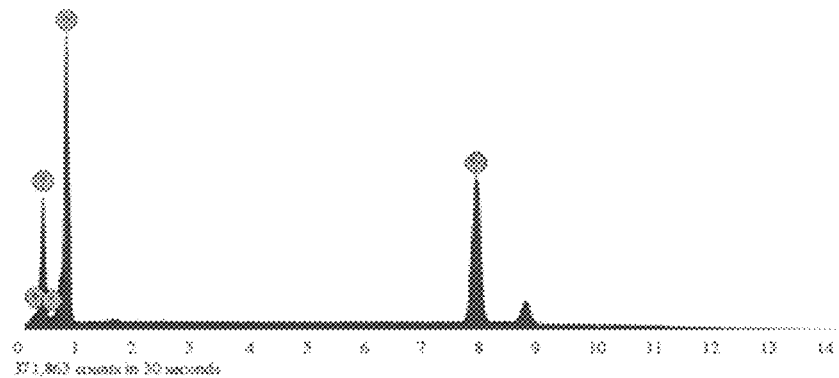
FIG. 26 is an EDS of the exemplary 91% porosity copper foam substrate of FIGS. 24 and 25, indicating degradation of the PFOTS backbone.

FIG. 24 provides images of a non-hydrophobic 91% porosity copper foam sample treated with PFOTS, after heating for 1 hour at 450° C., left image (magnified 39×), and at 1000× magnification in the right image. FIG. 25 provides additional images of non-hydrophobic 91% porosity copper foam treated with PFOTS, after heating for 1 hour at 450° C., at 5000× magnification, left, and 15,000× magnification, right. These images establish that the CuO nanowires still exist, and have not grown together, with additional oxidation upon heating in air. FIG. 26 provides EDS data for non-hydrophobic 91% porosity copper foam treated with PFOTS, after heating for 1 hour at 450° C. The silicon and carbon content have gone to zero, indicating that the PFOTS has decomposed, resulting in a concomitant loss of hydrophobicity.

Example 3 establishes that hydrophobic materials were obtained after fluorination of copper substrates. These processed substrates were functional at temperatures above about 450° C. and exhibited desired hydrophobicity.

Example 4

Additional copper substrates were prepared by submerging ultrasonically cleaned copper foams and foils into a mixture of 2.0 M NaOH and 0.15 M $(NH_4)_2S_2O_8$ for 30 minutes at room temperature. The copper samples were then rinsed with 18.3 meg-ohm water and absolute ethanol and air dried. Additional SEM images, and EDS results, for copper metal treatments are provided by FIGS. 27-32.

Although $CuO/Cu(OH)_2$ nanoneedles and microflowers were formed on both the Cu foam and coupons, the surface was not hydrophobic. The copper oxide/hydroxide system is known to be metastable, and converts to oxide just above room temperature. During the treatment, the room temperature was 28.3° C., which may have decreased the amount of hydrophobic $Cu(OH)_2$ structures formed. The EDS spectra showed aluminum, which may have been a contaminant in either the NaOH or the $(NH_4)_2S_2O_8$, and it could also have impacted the hydrophobicity of the surface.

Figure 27:
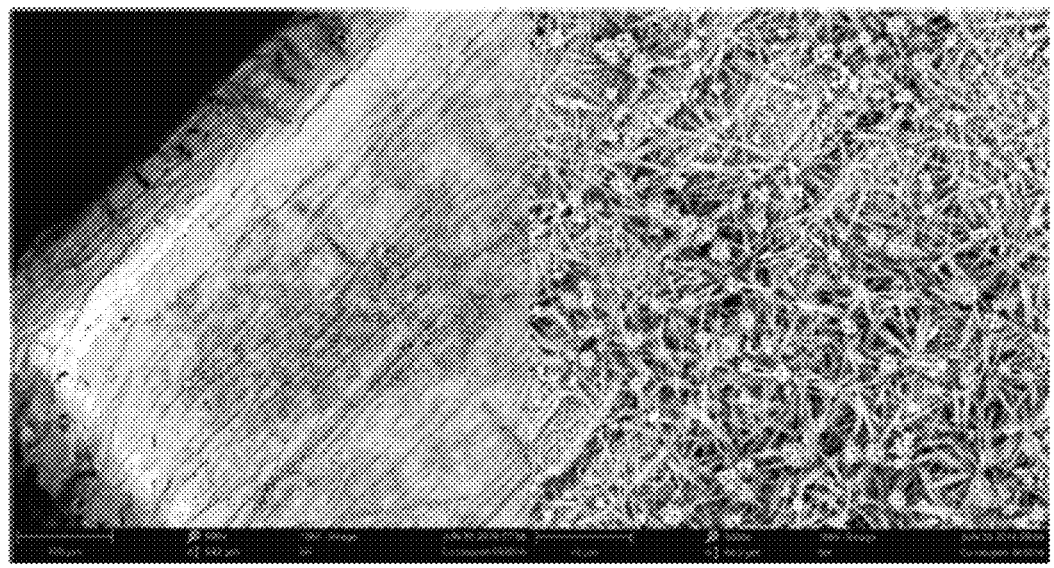
FIG. 27 provides images of an exemplary copper foil substrate treated with NaOH and $(NH_4)_2S_2O_8$ (500× magnification for left side image and 5000× magnification for right side image).
Figure 28:
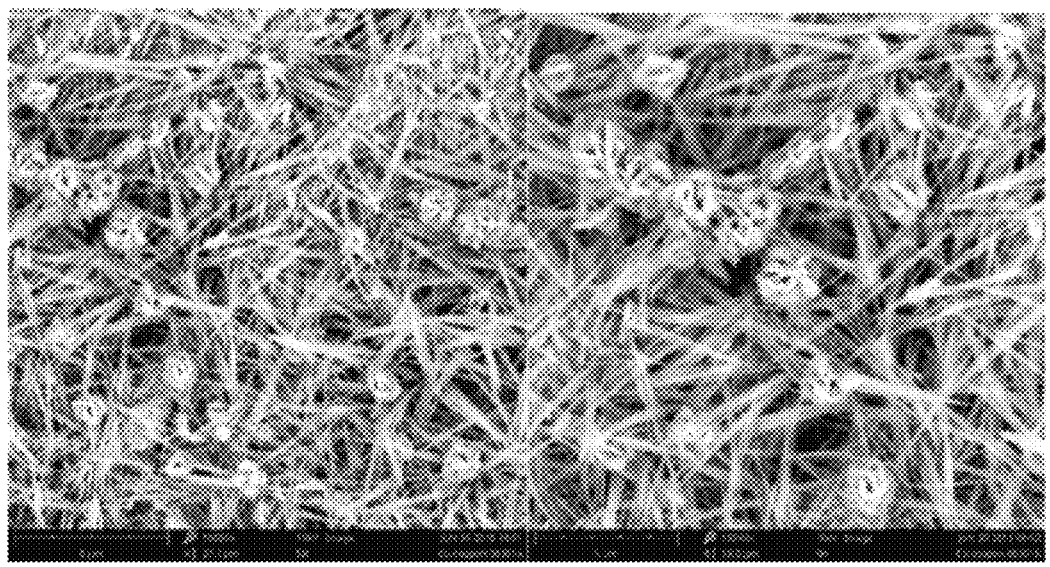
FIG. 28 provides additional images of the exemplary copper foil substrate of FIG. 27 (10,000× magnification for left side image and 15,000× magnification for right side image).
Figure 29:
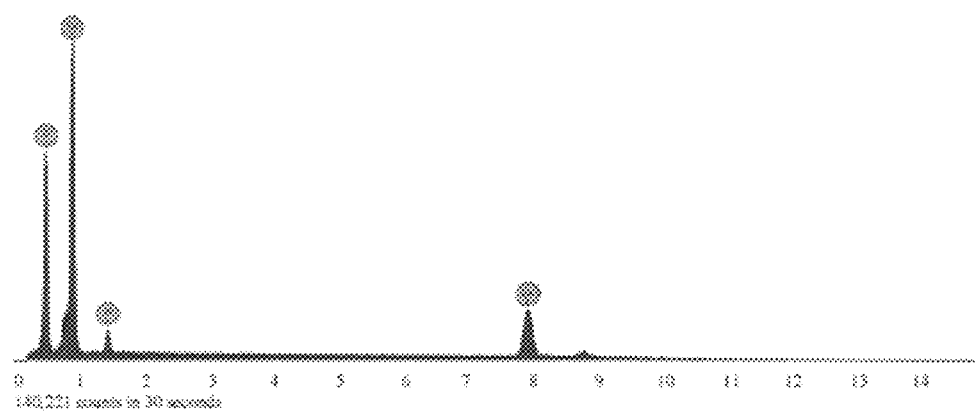
FIG. 29 is an EDS of the exemplary copper foil substrate of FIGS. 27 and 28.

FIG. 27 provides images of a sample of copper foil treated with NaOH and $(NH_4)_2S_2O_8$, magnified at 500× (the left side image), and at 5000× magnification (the right side image). FIG. 28 provides additional images of the copper foil treated with NaOH and $(NH_4)_2S_2O_8$, magnified at 10,000× magnification (the left side image), and at 15,000× magnification (the right side image). FIG. 29 is an EDS of the Cu foil treated with NaOH and $(NH_4)_2S_2O_8$.

Figure 30:
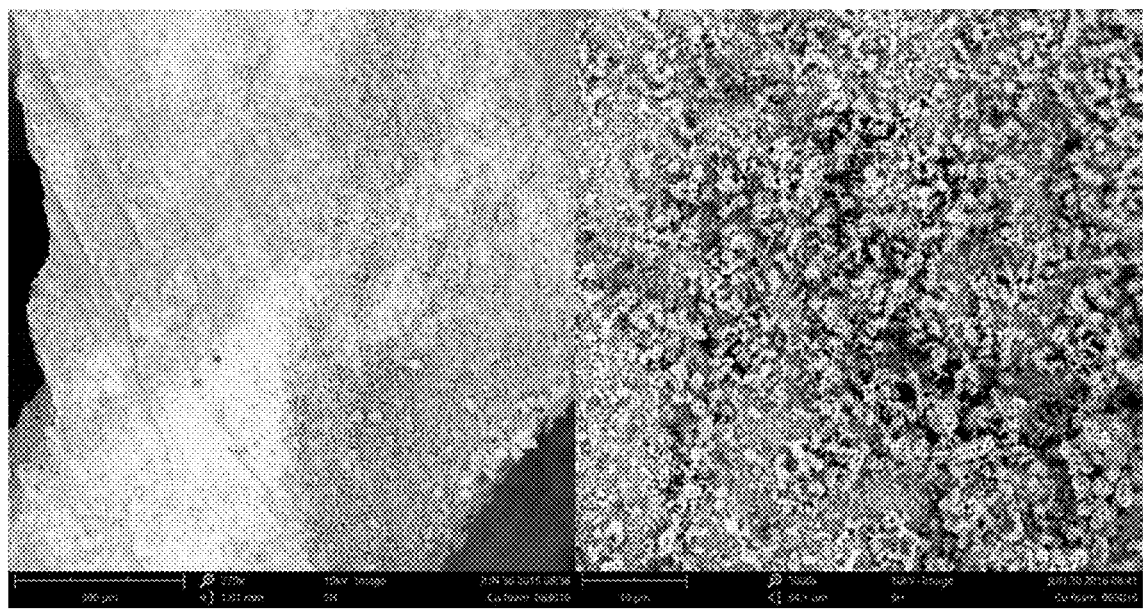
FIG. 30 provides images of an exemplary 91% porosity copper foam substrate treated with NaOH and $(NH_4)_2S_2O_8$ (270× magnification for left side image and 5000× magnification for right side image).
Figure 31:
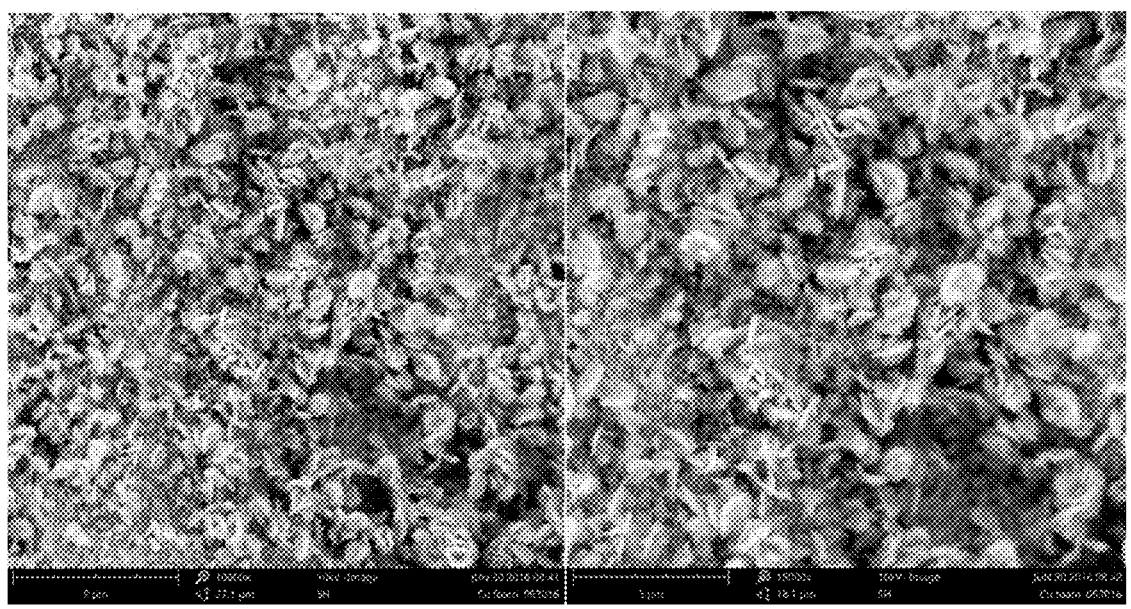
FIG. 31 provides additional images of the exemplary 91% porosity copper foam substrate of FIG. 30 (10,000× magnification for left side image and 15,000× magnification for right side image).
Figure 32:
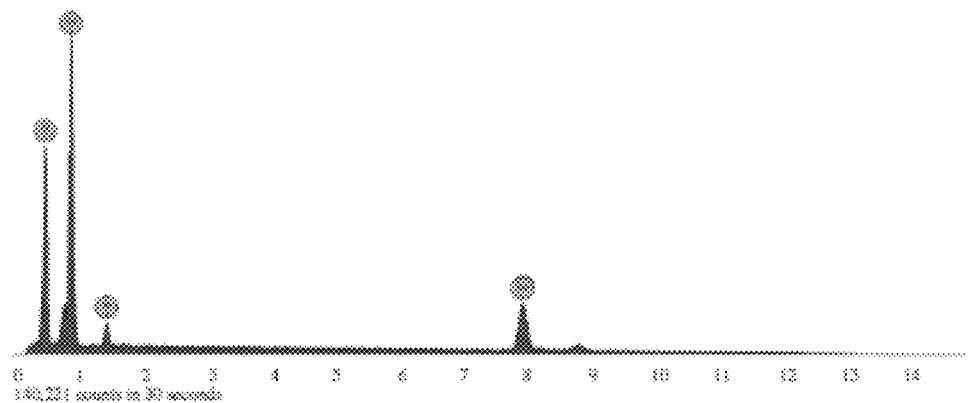
FIG. 32 is an EDS of the exemplary 91% porosity copper foam substrate of FIGS. 30 and 31, indicating a small amount of aluminum contamination.

FIG. 30 provides images of a sample of 91% porosity copper foam treated with NaOH and $(NH_4)_2S_2O_8$, magnified at 270× (the left side image), and at 5000× magnification (the right side image). FIG. 31 provides additional images of the sample of 91% porosity copper foam treated with NaOH and $(NH_4)_2S_2O_8$, magnified at 10,000× (the left side image), and at 15,000× magnification (the right side image). FIG. 32 is an EDS of the 91% porosity copper foam treated with NaOH and $(NH_4)_2S_2O_8$. The data show a small amount of Al contamination, which possibly came from starting materials.

Example 5

Metallized aluminosilicate substrates were prepared to assess their hydrophobicity and thermal stability compared to copper-based substrates. A substrate comprising inorganic aluminosilicate provides a porous, heat-stable material that offers several advantages over current organic filtration systems, including improved safety during and after fires, as well as in the event of a fire sprinkler system activation.

Aluminosilicate substrate (970-J Fiberfrax) was first calcined at 1000° C. for 4 hours to remove residual surface latex. Copper was sputter-coated onto aluminosilicate at six different thicknesses: 3 μm, 1 μm, 500 nm, 250 nm, 100 nm, and 50 nm. The sample comprising a 1 μm copper layer was cleaned of CuO by submerging the copper surface for 2 minutes in 1M HCl. The Cu-coated aluminosilicate substrate looked bright with no holes in the Cu surface from the acid cleaning. It was rinsed 3 times with 18.3 meg-ohm water. The sample was then heated to 550° C. for 24 hours on a silicon disk that was ultrasonically cleaned in ethanol for 10 minutes and rinsed with 18.3 meg-ohm water.

Because the resulting CuO nanowires were only a very thin layer on the aluminosilicate substrate, two more Cu-coated aluminosilicate substrate samples (50 nm and 3 μm thickness) were heated to 550° C. for 24 hours to grow nanowires on their surfaces. The 50 nm Cu coating was not cleaned with acid solution prior to heating to avoid losing the very thin copper layer, but the 3 μm Cu coating was immersed for 1 minute in 1M HCl and rinsed with 18.3 meg-ohm water. After the 24 hour furnace treatment, the "3 μm" CuO coating (the 3 μm Cu coated aluminosilicate substrate sample after heating to 550° C. for 24 hours) looked denser than the coating on the other samples so it was further treated by submerging in 1 mM PFOTS for 30 minutes, triple rinsed with 18.3 meg-ohm water, and cured at 150° C. for 10 minutes.

Figure 33:
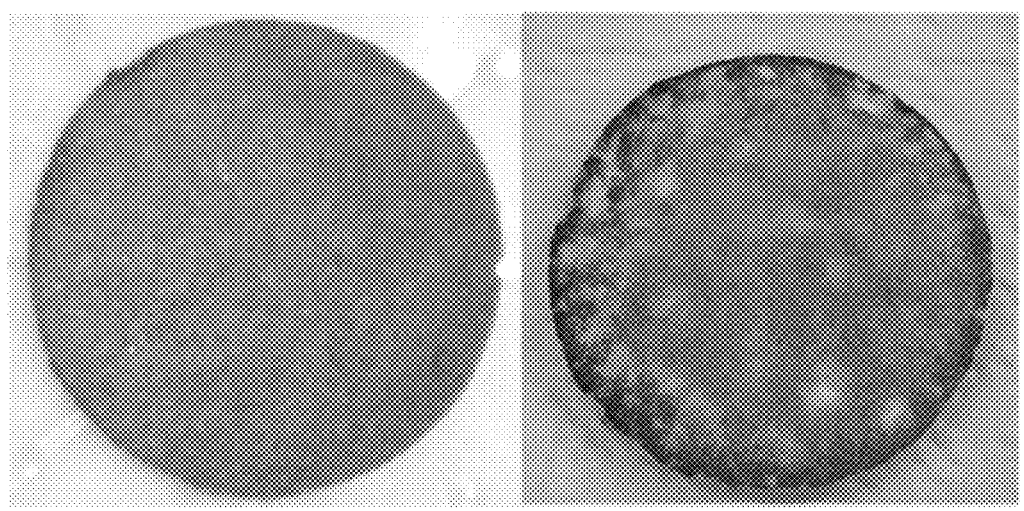
FIG. 33 provides images of an exemplary aluminosilicate substrate comprising a 1 µm copper coating before (the left side image) and after (the right side image) heating to 550° C. for 24 hours.
Figure 34:
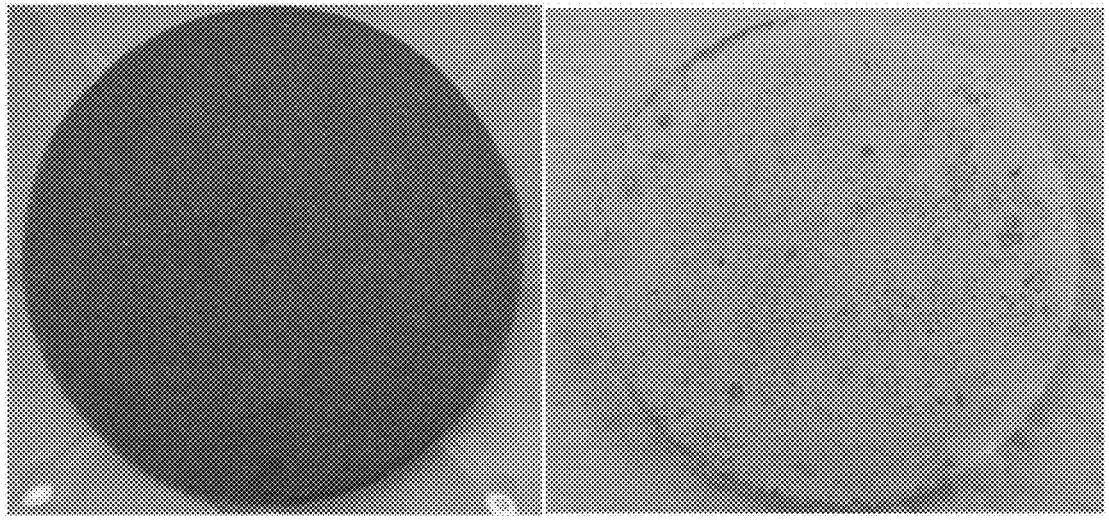
FIG. 34 provides images of an exemplary aluminosilicate substrate comprising a 50 nm copper coating before (the left side image) and after (the right side image) heating to 550° C. for 24 hours.
Figure 35:
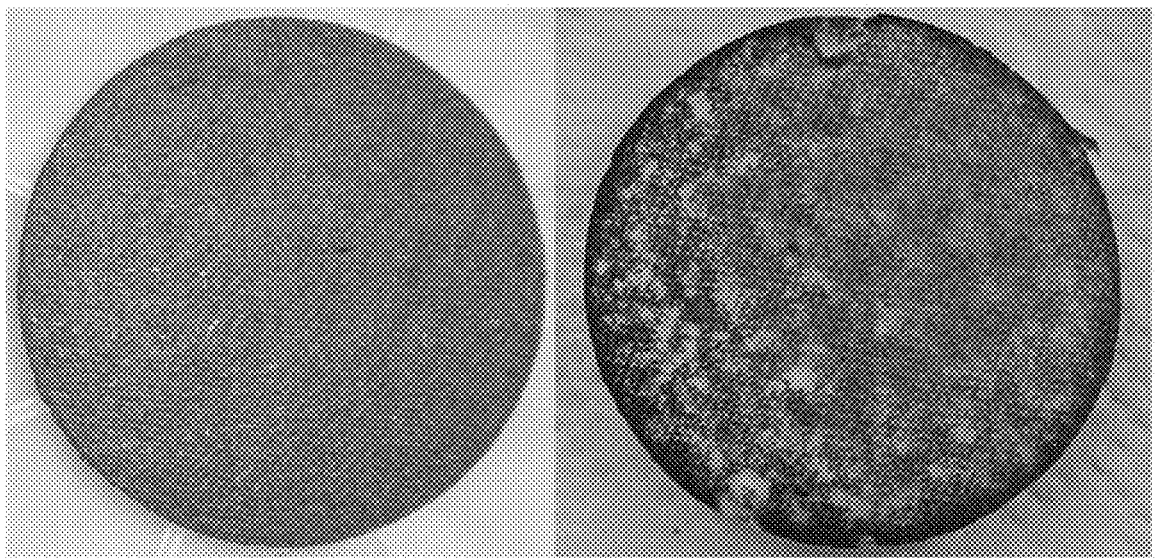
FIG. 35 provides images of an exemplary aluminosilicate substrate comprising a 3 µm copper coating before (the left side image) and after (the right side image) heating to 550° C. for 24 hours.
Figure 36:
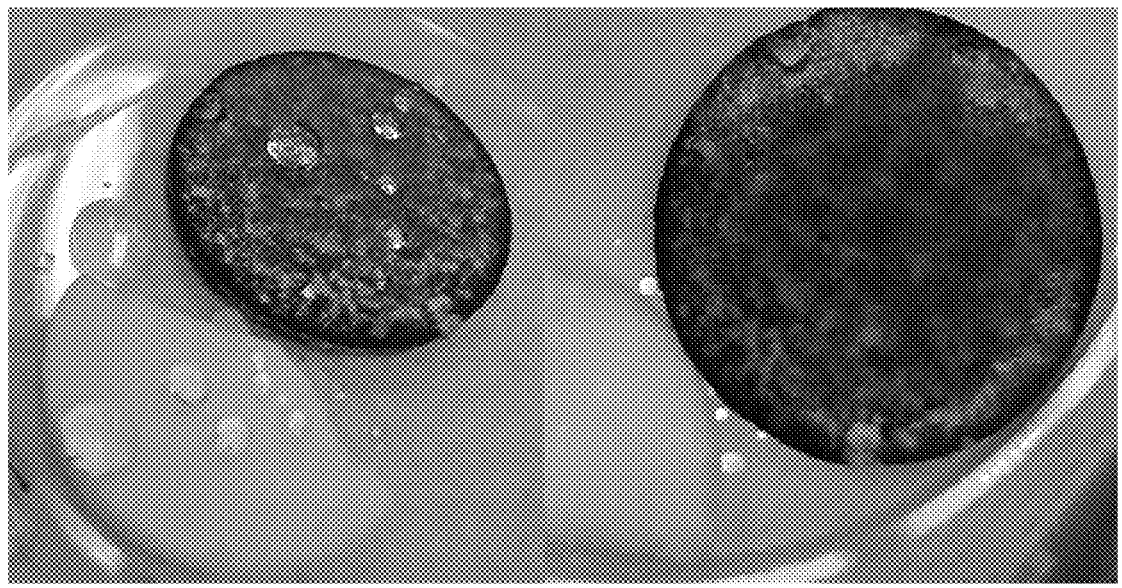
FIG. 36 provides images of an exemplary aluminosilicate substrate with and without a 3 µm PFOTS treated copper coating before (left side image) and after (right side image) heating to 450° C. for 1 hour, establishing that the samples are hydrophobic prior to heat treatment, but non-hydrophobic after heating.
Figure 37:
FIG. 37 is an image of water droplets on an exemplary hydrophobic inorganic filter material according to the present invention.

FIG. 33 provides images of an aluminosilicate material comprising a 1 μm Cu coating, left, and copper oxide formation on the sample after heating to 550° C. for 24 hours. The 1 μm Cu coating on aluminosilicate turned to a gray coating after heating to 550° C. for 24 hours. Copper oxide nanowires cover the entire surface. FIG. 34 provides images of a 50 nm Cu-sputter-coated aluminosilicate filter, left, and after heating to 550° C. for 24 hours, right. FIG. 35 provides images of an aluminosilicate material comprising a 3 μm Cu coating, left, and after heating to 550° C. for 24 hours. FIG. 36 provides images of the hydrophobic aluminosilicate material comprising a 3 μm CuO coating that has been treated with PFOTS, left, and after heating to 450° C. for 1 hour, which rendered the sample non-hydrophobic.

The similarly treated, Cu-sputter-coated 3 μm and 50 nm aluminosilicate samples were darker and lighter, respectively, compared to the 1 μm coated sample (see FIGS. 34 and 34). Because the 50 nm Cu coating was so thin, the sample was not cleaned with 1M HCl, whereas the sample with the 3 μm Cu coating was immersed for 1 minute in 1M HCl. Nanowires can be seen even though the surface of the 50 nm CuO coating is barely gray.

The "3 μm" CuO coating (the 3 μm Cu coated aluminosilicate sample after heating to 550° C. for 24 hours) appeared more even, was darker gray and was entirely covered with nanowires even though it still had some white patches (see FIG. 36). The "3 μm" CuO coating appeared denser after heating at 550° C. for 24 hours than the 50 nm and 1 μm CuO coatings and it was therefore treated with PFOTS, along with a calcined Fiberfrax filter.

Nanowires were grown on Cu substrates to increase roughness. Without being bound by a theory of operation, roughness creates air pockets, which can increase hydrophobicity when treated with a halogenating agent, such as a haloalkylsilane. Fiberfrax with the latex baked off was already rough and provided terminal oxide groups, so it made a good substrate to treat with PFOTS.

Both the "3 μm" CuO coating and the Fiberfrax samples were hydrophobic on the top surface and both failed only after being heated to 450° C. for 1 hour. However, the bottom of the "3 μm" CuO coated material wicked water when tested after heating to 425° C. for 1 hour; the PFOTS may have decomposed on that surface due to more efficient thermal transfer from the Si wafer they were resting on. Up until 425° C., the bottom surfaces were as hydrophobic as the top surfaces.

Water contact angles and failure temperatures are summarized for the copper materials in Table 3. CF refers to the 3 μm copper-coated aluminosilicate sample; the Cu foam samples are both 91% porosity; and the Cu coupon refers to the copper foil substrate.

TABLE 3

Contact Angles and Failing Temperatures for Copper Surfaces Treated with PFOTS

| Sample Name | Initial WCA (°) | Fail Temp |
|---|---|---|
| Cu coupon | 118 | NT |
| Cu Foam 1 | 120 | 450 |
| Cu Foam 2 | 123 | 450 |
| 3μm Cu CF | 120 | 425 |

The copper foam and copper-coated aluminosilicate materials provided hydrophobic and thermally stable filter materials.

Example 6

This example concerns fluorination of an aluminosilicate fiber substrate without a copper coating to provide hydrophobic and thermally stable materials. Multiple conditions were varied to identify processes for producing heat-resistant coatings on an aluminosilicate polymer (Fiberfrax, obtained from Unifrax), after its organic binder was removed at 538° C. via calcining. Aluminosilicate samples were cut into 37 mm diameter circles before being treated. Some samples were calcined at 1,000° C. after discovering that such material was more friable while others were not calcined before treatment. Standard treatment involved immersing aluminosilicate samples in a 1 mM perfluorooctyltrichlorosilane (PFOTS) in hexane solution for 30 minutes, and then curing the samples at 150° C. for 10 minutes. The treatment time, curing time, as well as the number of subsequent treatments to the material, are summarized below in Table 4.

TABLE 4

| Sample Name | Initial WCA (°) | Failure Temp. (°) | Fiberfrax | Age of PFOTS (days) |
|---|---|---|---|---|
| 30 Min 1 mM PFOTS | 120 | 425 | | 0 |
| 60 Min 1 mM PFOTS | 136 | 425 | | 11 |
| 90 Min 1 mM PFOTS | 134 | 425 | | 11 |
| 1 Coat 1 mM PFOTS | 120 | 400 | | 10 |
| 2 Coat 1 mM PFOTS | 120 | 450 | Calcined | 11-14 |
| 3 Coat 1 mM PFOTS | 136 | 475 | | 11-15 |
| 3 Coat 1 mM PFOTS | 141 | 450 | | 0 to 1 |
| 4 Coat 1 mM PFOTS | 126 | 425 | | 0 to 2 |
| 3 Coat 3 mM PFOTS | 125 | 475 | | 0 to 1 |
| 4 Coat 3 mM PFOTS | 125 | 450 | | 0 to 2 |
| 1 Coat 1 mM PFOTS NC 2 Hr | 134 | 400 | | 15 |
| 1 Coat 1 mM PFOTS NC overnight | 122 | 400 | Uncalcined | 0 |
| 1 Coat 1 mM PFOTS | 120 | 400 | | 0 |

NC = not cured after treatment.

Figure 38:
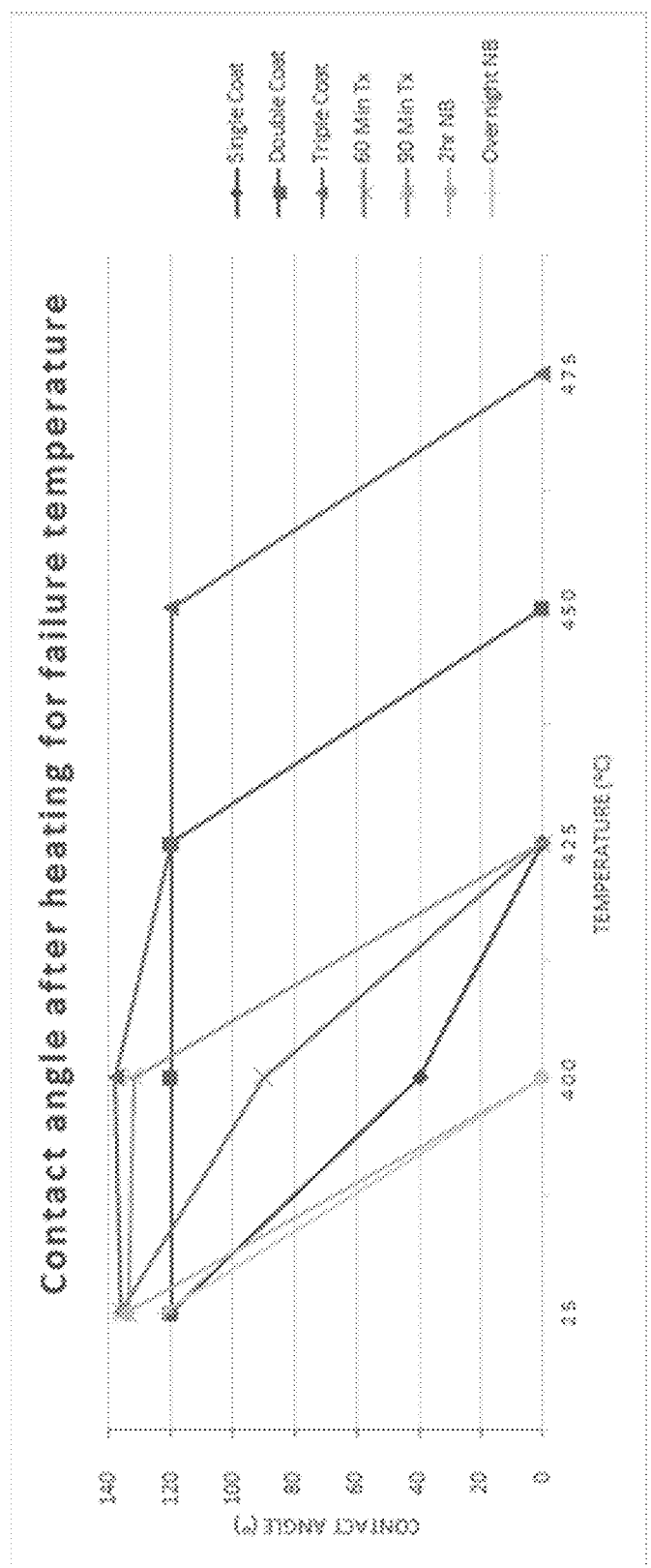
FIG. 38 is a graph of contact angle)(° and failure temperature (° C.) for a series of exemplary hydrophobic inorganic filter materials.

The stability of PFOTS in ambient conditions was also tested by preparing serial samples after leaving PFOTS solution in a fume hood. Samples were then tested for hydrophobicity using a Tantec water contact angle analysis device. FIG. 38 is photograph of water droplets on a filter coated 3 times with 1 mM PFOTS.

Filters found to be hydrophobic were then tested for temperature dependence to determine the failure temperature at which hydrophobic properties were lost. The results of these tests are provided by Table 4, and Table 5 below. The water contact angles for all treated samples were greater than 120°.

TABLE 5

| Sample Name | Initial WCA (°) | Fail Temperature (° C.) |
|---|---|---|
| standard | 120 | 400 |
| 60 minute treatment | 136 | 425 |
| 90 minute treatment | 134 | 425 |
| 2 coat | 120 | 450 |
| 3 coat | 136 | 475 |
| 2 hours, not calcined (NC) | 134 | 400 |
| overnight (NC) | 122 | 400 |

Data obtained from this example establishes that uncalcined samples have lower failure temperatures than calcined samples; cured samples generally showed no increase in hydrophobicity compared to air dried samples, but cured samples have higher failure temperatures than non-cured samples; the PFOTS solution was viable for at least 2 weeks outside of an inert atmosphere box; and an increased immersion time in PFOTS increased the contact angle, but also increased the affinity for water droplets to stick to the surface. Also, triple coating offered an advantage over double and quadruple in hydrophobicity based on contact angle, as well as a slightly better performance at high temperatures. A graph of the contact angle versus temperature is shown in FIG. 38.

The process of calcining samples before treating them both decreased possible health hazards from the friability of the material while also offering a more hydrophobic filter after treatment. Previously calcined and tested samples showed failure temperatures 25-50° C. above those exhibited by uncalcined substrates. This effect may be explained by a change in crystalline structure of the aluminosilicate materials from a kaolinite to a mullite phase.

Figure 39:
FIG. 39 is an image showing a sphere of water on an exemplary hydrophobic inorganic filter material triple coated with 1 mM PFOTS.

The addition of multiple coats of PFOTS on an already treated sample disc increased water contact angles relative to a single treatment. Multiple coats also increased the failure temperature. Triple coating appears to surpass double coating as temperature increases, and displays superior shedding of water when tested. FIG. 39 is a photograph showing a sphere of water that demonstrates the hydrophobicity of a sample triple coated with 1 mM PFOTS.

The stability of PFOTS outside of an inert atmosphere box allows further industrial efficiency when producing filters for waste apparatuses, as the solution may be kept safely in a chemical hood area rather than needing an inert gas box to keep the solution viable.

Example 7

Additional trials were performed to optimize methods for forming filter materials comprising an aluminosilicate fiber substrate using the procedures described above to determine if more thermal stability could be achieved. This example uses aluminosilicate 972-JH Fiberfrax fibers available from Unifrax, which differ slightly from the 970-J Fiberfrax that was used for the copper sputter-coated samples by being subjected to a heat treatment to 538° C. (1000° F.) to remove latex. 972-JH Fiberfrax samples were cut into 37 mm diameter circles before being treated. Initially samples were made without calcining at 1000° C. for 4 hours. But after discovering that calcining made the material less friable and more stable at high heat, all samples were calcined at 1000°

C. Standard treatment involved immersing Fiberfrax samples in a 1 mM 1H, 1H, 2H, 2H-perfluorooctyltrichlorosilane (PFOTS) in hexane solution for 30 minutes, rinsing with hexane, then curing the samples at 150° C. for 10 minutes. Multiple steps in the standard treatment were studied in detail, namely treatment time and curing time, as well as the number of subsequent treatments (or coats) to the material. The stability of PFOTS in room air was also tested by preparing serial samples after leaving PFOTS solution in a fume hood instead of an inert atmosphere box. Samples were then tested for hydrophobicity using water contact angle analysis. Filters found to be hydrophobic were then tested for temperature dependence to determine the temperature at which their hydrophobic properties were lost.

A water contact angle goniometer apparatus was used to determine contact angles and to quantify the relative hydrophobicity of each sample. All treated samples showed water contact angles greater than 120°. In reality, contact angles are likely higher, but the fibrous surfaces made it difficult to measure the contact angle. The standard treatment and overnight no cure samples had initial water contact angles of 120° and 122°, respectively, and had a failure temperature of 400° C. The overnight no cure sample had a contact angle of 134°, but similarly failed at 400° C. The 90 and 60 minute treatment time samples had high contact angles of 134° and 136°, respectively; however, they also had a lower common failure temperature of 425° C. This method of treatment also produced filter materials having a higher affinity for water, with slip angles higher than any other treatment used.

Water contact angles, failure temperatures, and other experimental parameters for additional samples made using aluminosilicate substrates and PFOTS are shown in Table 4, and Table 6, below.

TABLE 6

Contact Angle and Failure Temperature for Aluminosilicates Treated with PFOTS

| Sample | CA (°) | Failure Temp (° C.) |
|---|---|---|
| Calcined 972-JH (control) | — | — |
| 2 hr ambient cure, 1 mM, uncalcined | 134 | 400 |
| 1 coat, 1 mM, calcined | 120 | 400 |
| 2 coat, 1 mM, calcined | 120 | 450 |
| 3 coat, 1 mM, calcined | 125 | 475 |
| 4 coat, 1 mM, calcined | 126 | 425 |
| 4 coat, 3 mM, calcined | 125 | 450 |
| Overnight ambient cure, 1 mM, uncalcined | 122 | 400 |
| Uncalcined 972-JH (control) | 125 | 475 |
| 1 coat, 5 mM, calcined | 130 | 450 |
| 1 coat, 5 mM, calcined, ambient cure | 130 | 450 |
| 3 coat, 5 mM, calcined | 130 | 450 |
| 4 coat, 5 mM, calcined | 133 | 475 |
| 5 coat, 5 mM, calcined | 140 | 475 |
| 6 coat, 5 mM, calcined | 140 | 475 |
| 1 coat, 10 mM, calcined | 134 | 475 |
| 2 coat, 10 mM, calcined | 132 | 475 |
| 3 coat, 10 mM, calcined | 146 | 475 |

Figure 40:
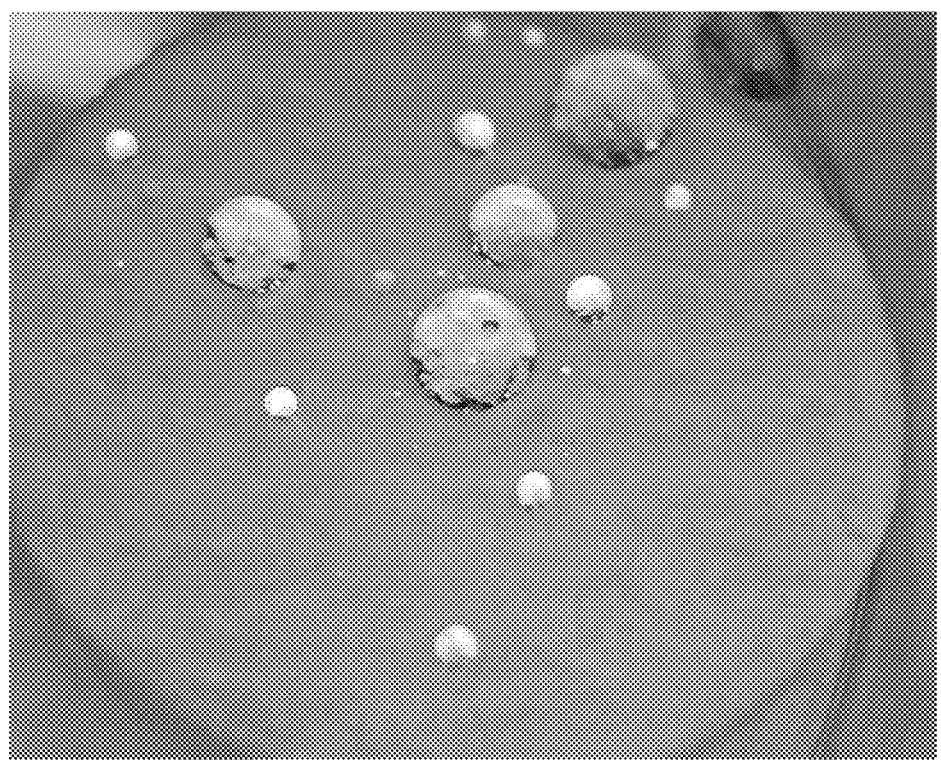
FIG. 40 is an image of water droplets on an exemplary aluminosilicate substrate treated with three coats of PFOTS establishing that the substrate is hydrophobic.

FIG. 40 is an image of water droplets on a sample of calcined 972-JH Fiberfrax treated with three coats of 3 mM PFOTS demonstrating that materials produced according to the present invention are hydrophobic. The deposition of multiple coatings provided materials having a range of contact angles (Table 6), with a triple coat of 10 m PFOTS having a contact angle of 146° (see FIG. 41) and a double coat 132°. These samples had a failure temperature of 475° C.

Uncalcined samples, whether given the standard treatment or the overnight room temperature cure, exhibited lower failure temperatures (400° C. rather than 425° C.) than calcined materials that were processed otherwise by the same procedures. The standard treatment showed little increase in hydrophobicity compared to those left to air dry overnight. SEM images of calcined and uncalcined Fiberfrax materials show little difference between calcined and uncalcined substrates.

Figure 41:
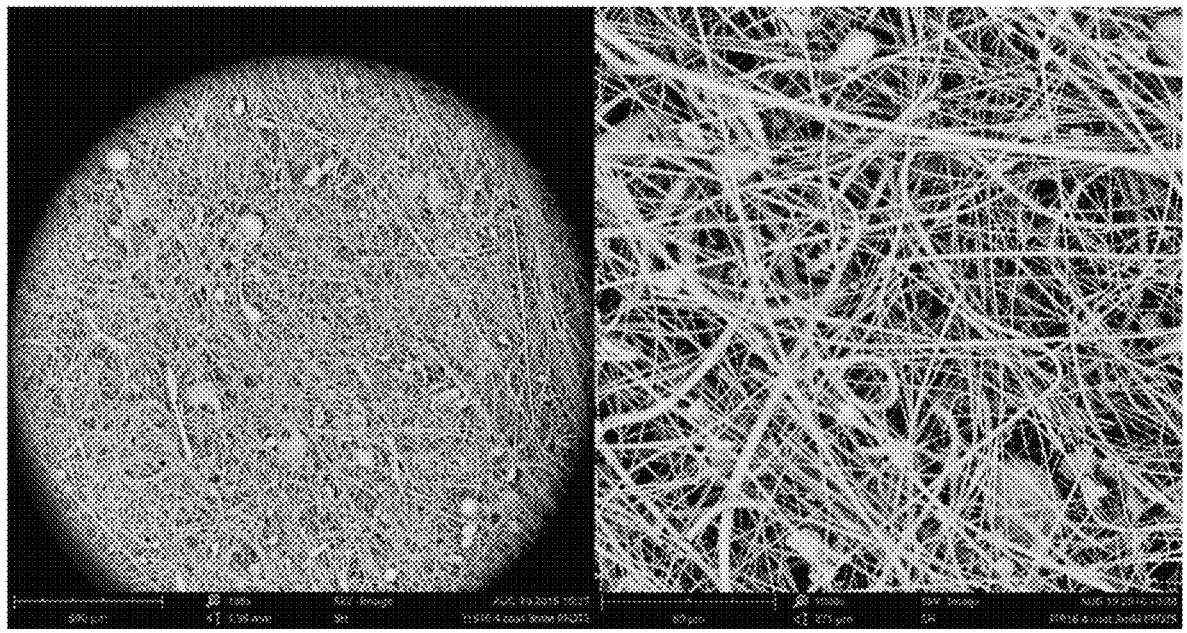
FIG. 41 provides images of a calcined exemplary aluminosilicate substrate comprising four coats of PFOTS (135× magnification for left side image and 1000× magnification for right side image).
Figure 42:
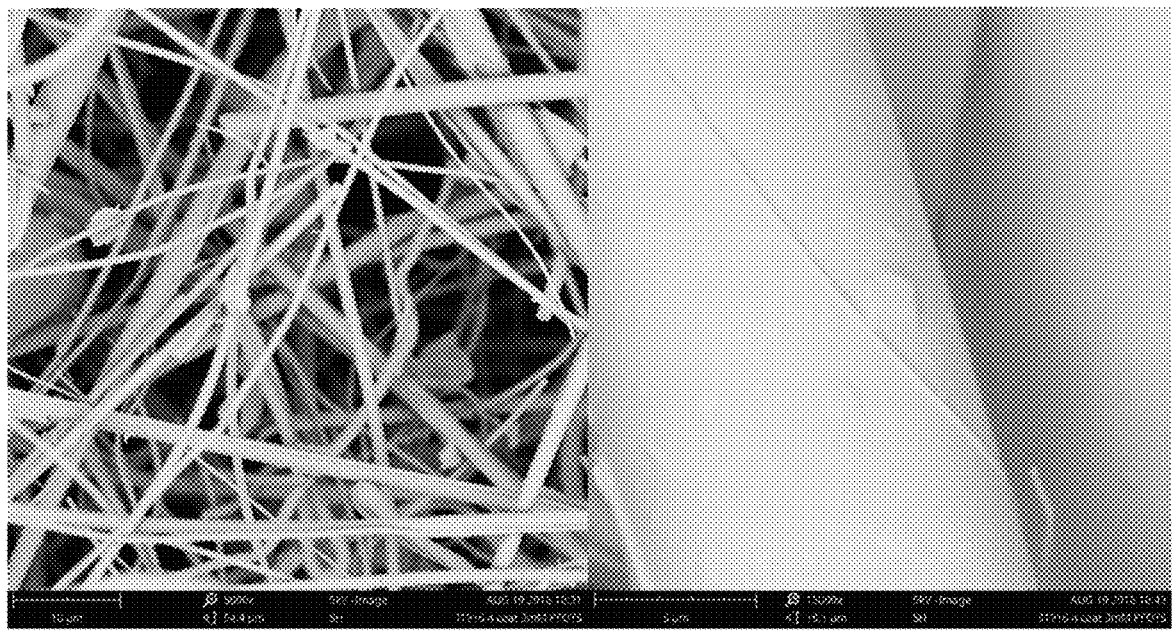
FIG. 42 provides additional images of a calcined exemplary aluminosilicate substrate comprising four coats of PFOTS (5000× magnification for left side image and 15,000× magnification for right side image).
Figure 43:
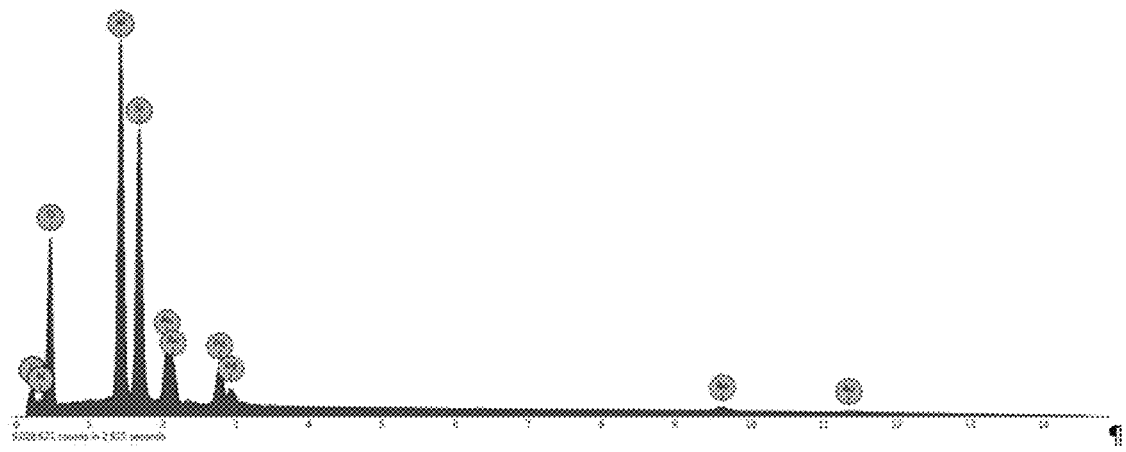
FIG. 43 is an EDS of the exemplary calcined aluminosilicate substrate of FIGS. 41 and 42.

FIG. 41 provides SEM images of a sample comprising four coats of 3 mM PFOTS on calcined 972-JH at 135× magnification, left, and 1000× magnification, right. FIG. 42 provides additional images of a sample comprising four coats of 3 mM PFOTS on calcined 972-JH at 5000× magnification, left, and 15,000× magnification, right. FIG. 43 is EDS data of a sample with four coats of 3 mM PFOTS on calcined 972-JH.

The lower degree of friability for the calcined materials may result from a sintering effect between fibers in contact with each other and this process is not observable with SEM. XRD patterns of crystalline structure of the aluminosilicate materials demonstrate a change from a kaolinite to mullite structure during the calcining process (see FIG. 44). The XRD analysis shows a more defined crystalline phase presented from calcined samples versus those that were not calcined. Both samples exhibited peaks indicative of sillimanite, a naturally occurring aluminosilicate mineral. The literature shows a change in structure of sillimanite with an increase in heat, displaying the addition of nanowhiskers on the surface of the substrate. The growth of surface nanowhiskers on the substrate may explain the improved performance exhibited by the calcined samples due to increased surface roughness.

Increased immersion time in PFOTS solution (90 and 60 minute treatment times) offered an increased contact angle, but also displayed a higher sliding angle to shed water droplets. This indicated that these materials, while acceptable as filter materials, nevertheless had a higher affinity for water. This treatment also offered a slight thermal stability advantage over standard treatment. Materials with high contact angles as well as high slip angles for liquids are described as being in the Wenzel state at the liquid-substrate interface. The liquid is no longer sitting on top of any hierarchical surface structure, but rather is also in place of cavities in the surface that would be filled with air if the system were in a Cassie-Baxter type of wetting. The ingress of water into cavities on the surface requires a higher amount of energy for water in the cavities to leave the surface of the substrate, and thus increases the slip angle of the material. This may indicate a difference in the order or adsorption of PFOTS to the substrate when left to immerse for longer times, as well as a different challenge to the filters, as pooling of water may cause failure and infiltration into the container.

Double, triple and quadruple coating the samples increased both hydrophobicity and operating temperature above single-coated samples. Surprisingly, triple coating provided slightly better results than double or quadruple coating. A multilayer lattice of PFOTS molecules on the surface of the aluminosilicate bolsters the coating performance. SEM and EDS data were taken on the sample comprising the most PFOTS coating, the calcined 972-JH Fiberfrax coated four times with 3 mM PFOTS solution (see FIGS. 42 and 43). Plate-like structures appear on some fibers, and there are deposits on the large fiber in the 15,000× magnification image. These could be artifacts of a thicker, non-uniform PFOTS coating resulting from multiple coatings. These thicker coatings may increase the failure temperature, and may also increase the time to failure.

The PFOTS in hexane solution remained viable in regular atmosphere after 15 days of being removed from an inert atmosphere box. However, it did become cloudy after about a month of ambient high humidity, and the PFOTS solution was discarded.

Attenuated total reflectance infrared (ATR-IR) spectroscopy was completed on all prepared samples to observe any chemical changes incurred from treatment with PFOTS, and also to understand their loss of hydrophobicity in the 400° C. to 475° C. temperature range.

Figure 44:
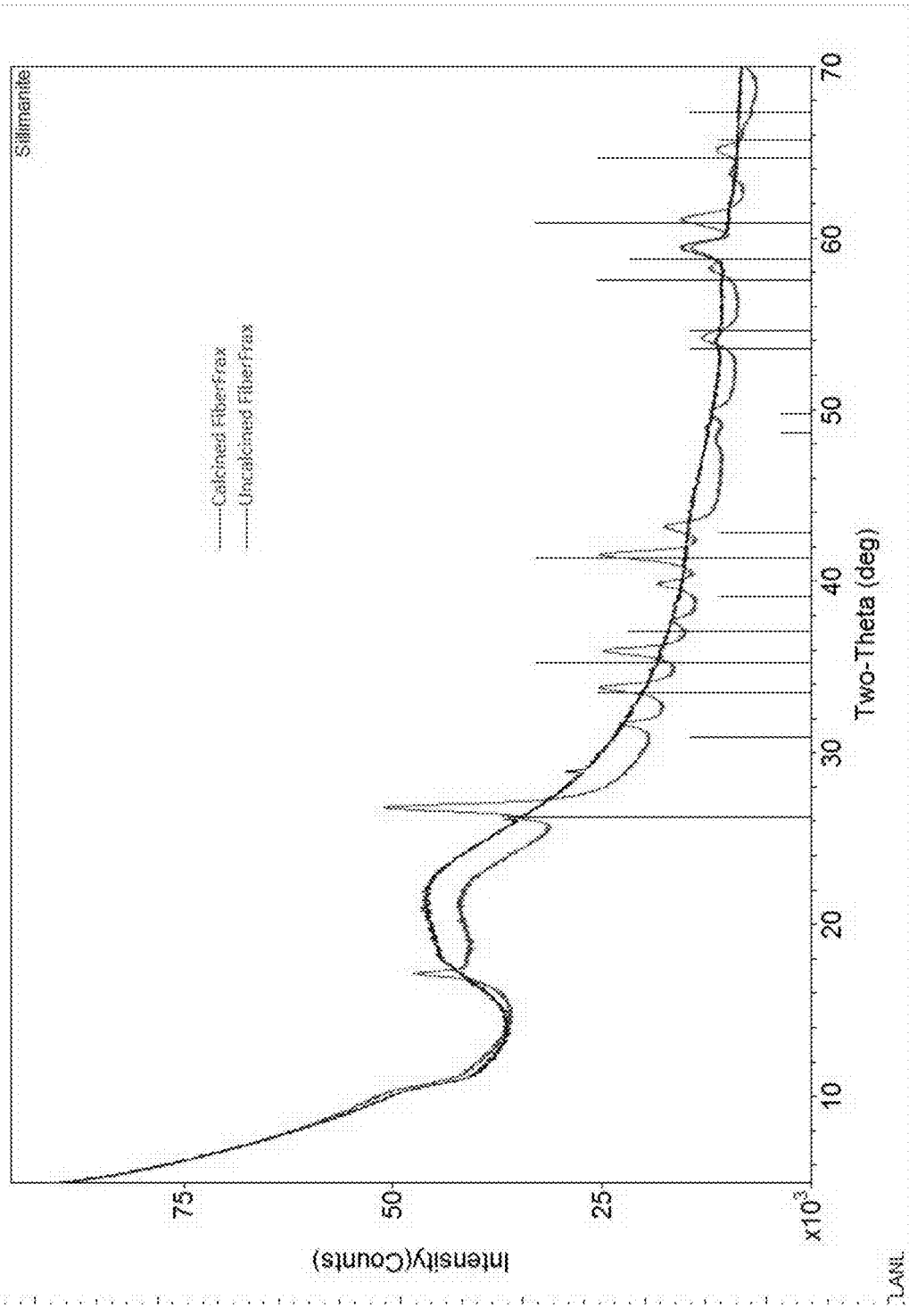
FIG. 44 is a comparative XRD analysis of two exemplary aluminosilicate substrates.
Figure 45:
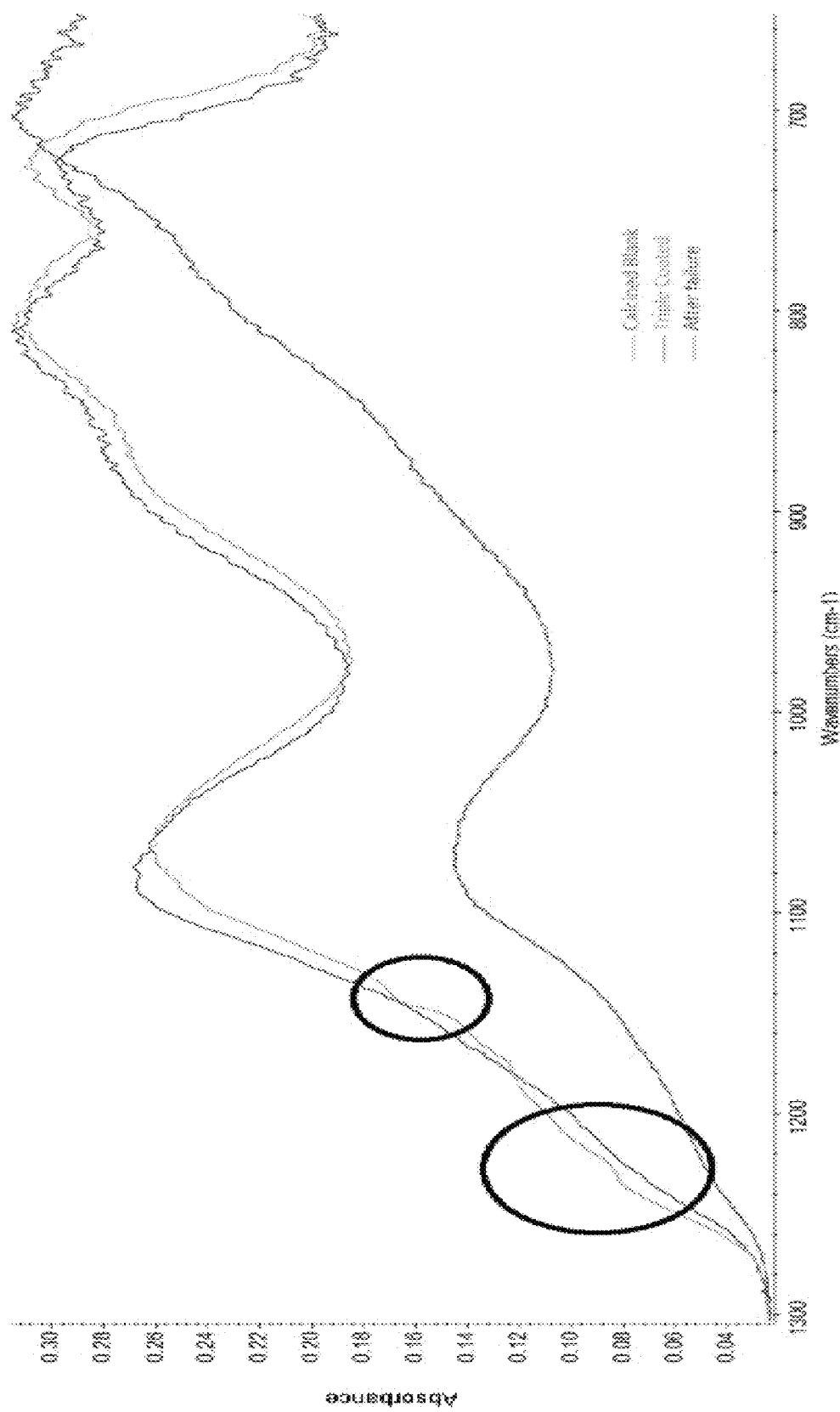
FIG. 45 provides attenuated total reflectance infrared (ATR-IR) spectra of three exemplary calcined aluminosilicate substrates (calcined with no coating, calcined with three PFOTS coats, and calcined with three PFOTS coats after failure).
Figure 46:
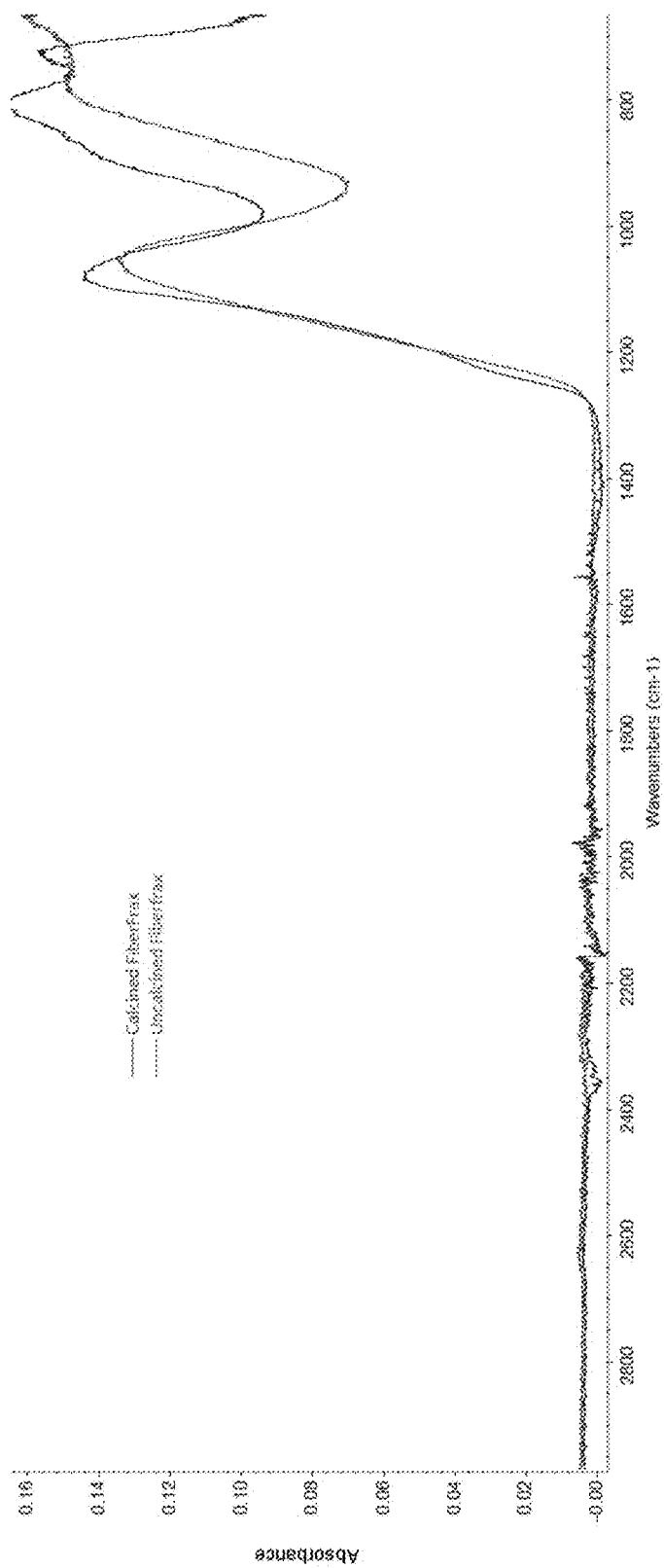
FIG. 46 provides ATR-IR spectra of two exemplary aluminosilicate substrates (calcined and uncalcined).

FIG. 45 provides ATR-IR spectra of untreated, triple coated, and failed PFOTS coated aluminosilicate samples. Peaks indicative of PFOTS adsorption are circled. FIG. 46 provides ATR-IR spectra of calcined and uncalcined Fiberfrax samples. FIG. 44 provides a comparative XRD analysis of calcined and uncalcined Fiberfrax samples. Black bars show usual peaks of sillimanite materials.

Small peaks and shoulders indicative of the carbon-fluorine bonds of PFOTS at 1250, 1200, and 1150 cm$^{-1}$ were observed in calcined Fiberfrax triple coated with 1 mM PFOTS. Peaks were more apparent on the triple coated samples than other treatments and therefore were used to attempt to determine change in the treated samples. These peaks were not observed in samples heated beyond the failure temperature (see FIG. 46). These results indicate that the failure mechanism may be decomposition of the PFOTS at temperatures higher than 400° C.

Differing ATR-IR spectra occurred when viewing uncalcined and calcined materials. Peaks were seen at about 1300, 1100, 900, 800, and 750 cm$^{-1}$ in calcined samples and 1050 and 800 wavenumbers in uncalcined samples (see FIG. 46). These peaks agree with reported peak positions for Si—O bonds at 1300, 1100 and 1050, and 800 cm$^{-1}$, as well as peaks at 900 cm$^{-1}$ and 750 cm$^{-1}$ at positions corresponding to sillimanite materials. This change in material after being calcined at 1000° C. was further confirmed using x-ray diffraction (XRD) analysis. While both calcined and uncalcined samples displayed characteristics of the aluminosilicate mineral sillimanite, the calcined sample displayed a more pronounced crystalline structure as visible from the increased number and intensity of peaks (see FIG. 44).

Figure 48:
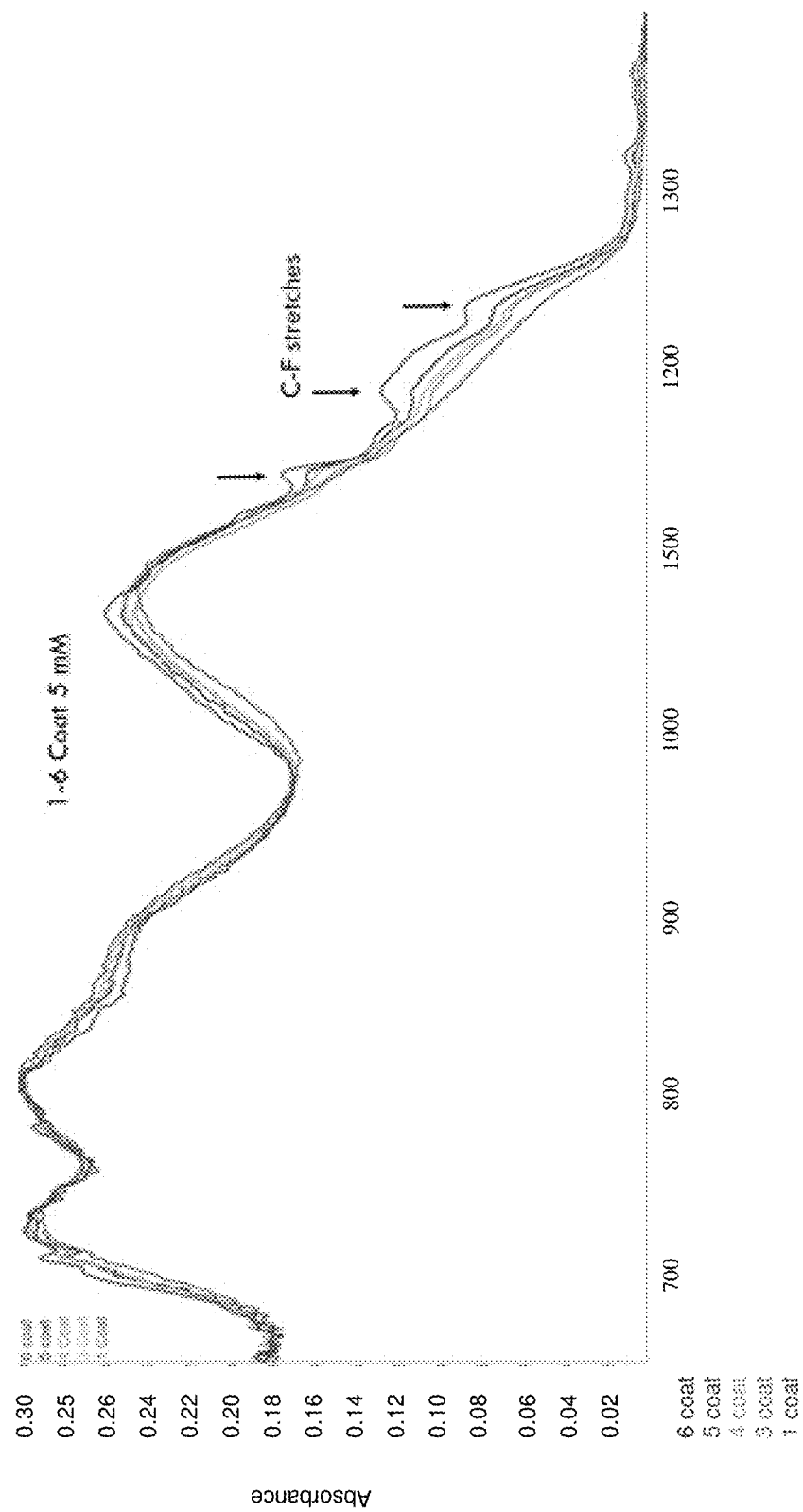
FIG. 48 provides plural ATR-IR spectra verifying chemisorption of different PFOTS coatings to aluminosilicate substrate material.

Chemisorption of the multiple PFOTS treatments to the aluminosilicate surface was verified by ATR-IR spectroscopy, as well as studied at failure temperature using TGA metrics. See, FIG. 48. The ATR-IR spectra indicated an increasing intensity of C—F peaks (located at 1250, 1200, and 1150 wavenumbers) with increased coating treatments.

Figure 49:
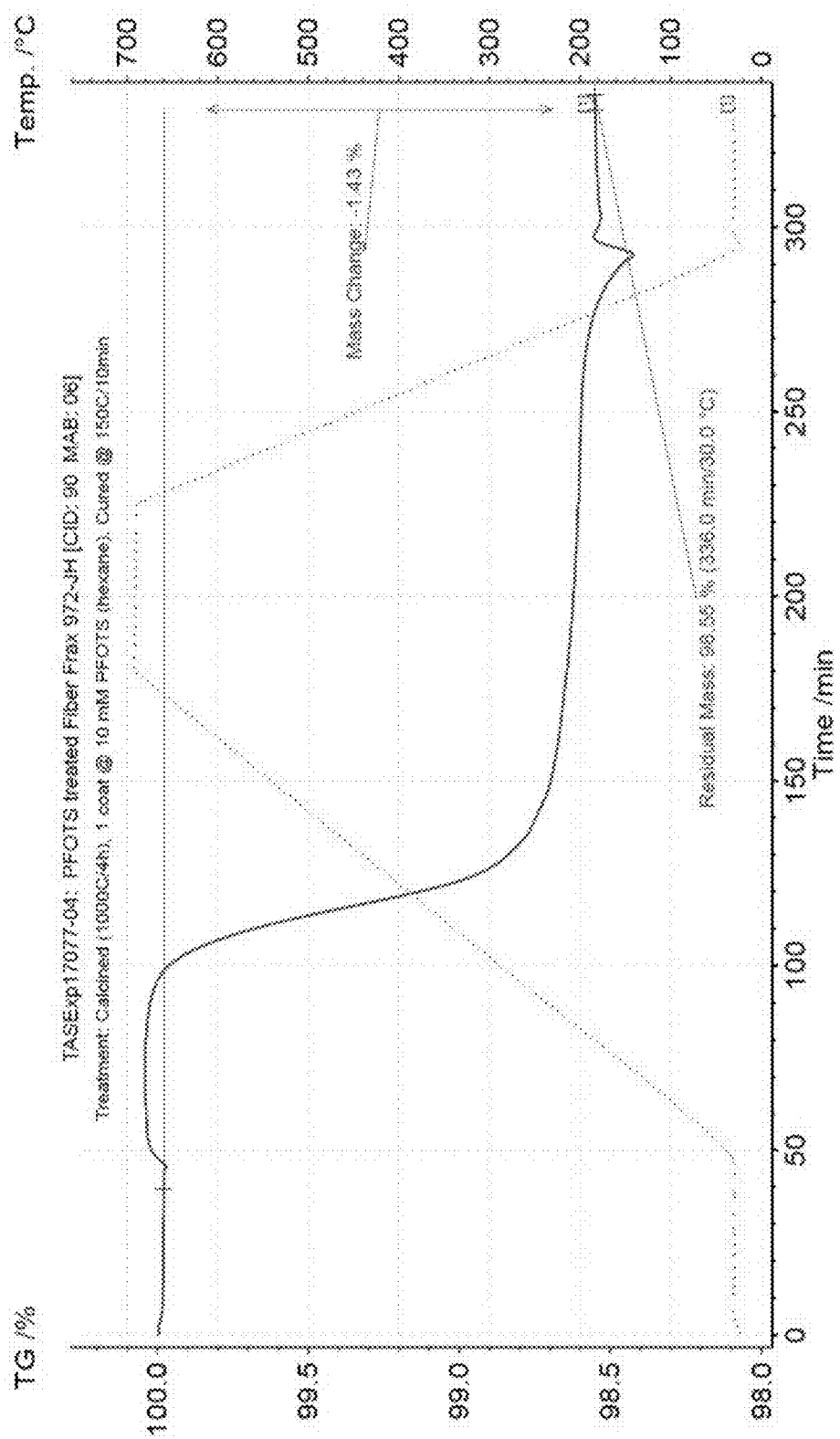
FIG. 49 provides thermogravimetric data establishing the loss of PFOTS molecules from aluminosilicate substrates treated with PFOTS.
Figure 50:
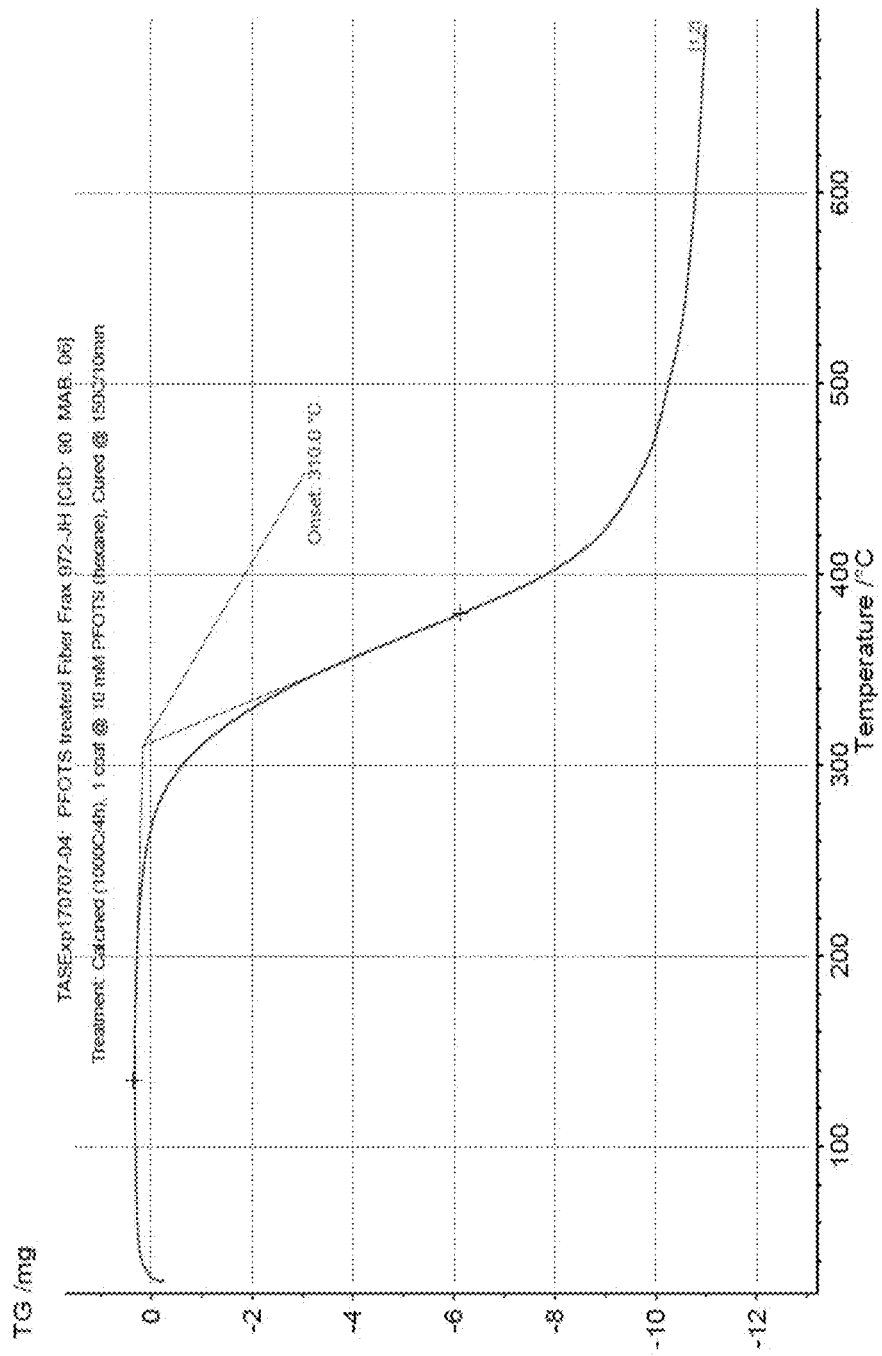
FIG. 50 provides thermogravimetric data for a calcined aluminosilicates substrate material treated with 1 coat of 10 mM PFOTS and cured at 150° C. for 10 minutes, illustrating a 480° C. failure temperature for this sample.
Figure 51:
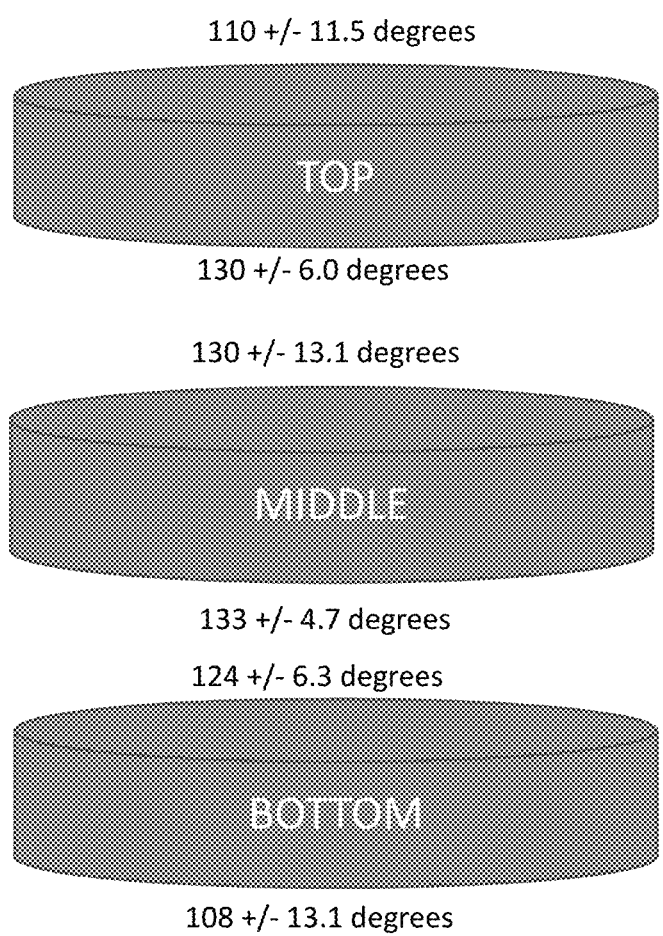
FIG. 51 is a schematic drawing that provides water contact angles for each surface of three (a top, middle and bottom) filters heated in a SAVY™-4000 container, wherein filters having surfaces touching the metal holder had lower contact angles (108-110° C.) than those that did not (124-133° C.).

Additional verification of PFOTS adsorption was completed by thermogravimetric analysis. FIG. 49 illustrates that a 1.43 wt % loss occurred after heating the 10 mM PFOTS coating to 700° C., which is well past the suspected failure temperature of the material. FIG. 50 is TGA graph for a calcined aluminosilicate substrate material treated with 1 coat of 10 mM PFOTS and cured at 150° C. for 10 minutes, illustrating that this sample had a 480° C. failure temperature.

Aerosol analysis determined that filters treated with 3 mM PFOTS that were both triple and quadruple coated, as well as filters with a 1 mM PFOTS triple and quadruple coat treatment, passed filter efficiency tests. Pressure drop measurements were taken with the efficiency measurements. These measurements are comparable to one layer of Fiberfrax tested in the same fixture. Table 7 provides the results for these tests.

TABLE 7

| Filter Efficiency and Pressure Drop Data for Coated Fiberfrax Material. | | |
|---|---|---|
| Sample Name | Percent Penetration | Pressure Drop (in WC) |
| 3 Coat 1 mM PFOTS | 0.0008 | 0.2 |
| 3 Coat 3 mM PFOTS | 0.0005 | 0.336 |
| 4 Coat 1 mM PFOTS | 0.0004 | 0.338 |
| 4 Coat 3 mM PFOTS | 0.0003 | 0.345 |

Filters tested in the water column apparatus included 3 mM PFOTS triple and quadruple coated samples, as well as 1 mM PFOTS quadruple coated filters. All filters deterred water ingress into the container at both 6 and 12 inches of water column increments for one minute each. Further, the 3 mM PFOTS quadruple coated sample withstood a 6 inch water column for 2 hours.

PFOTS, when used on appropriate substrates, forms a self-assembled monolayer after chemical adsorption on the surface of the material. Without being bound by a theory of operation, the trichlorosilane "head" group located on one end of the molecule appears to be the active site for the molecule to attach to oxygen and hydroxyl groups present on the substrate surface, as illustrated below:

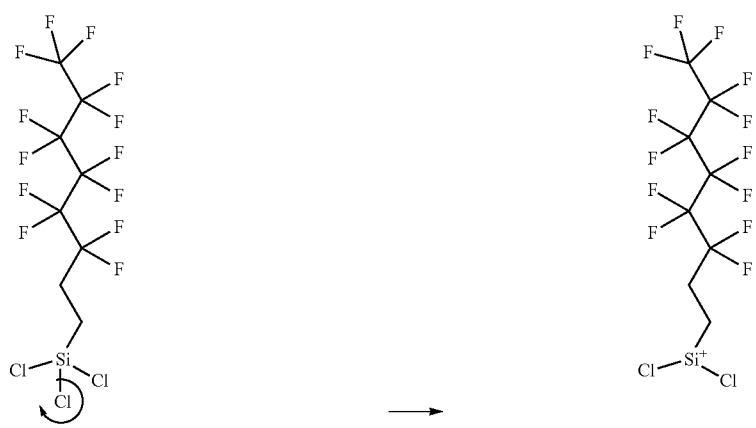

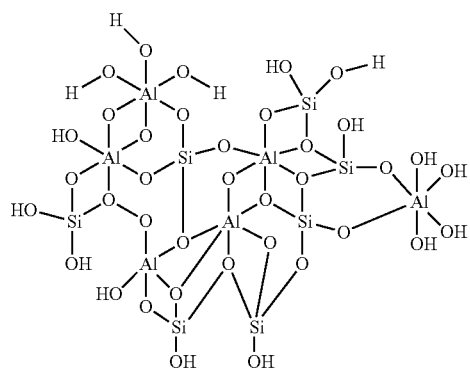
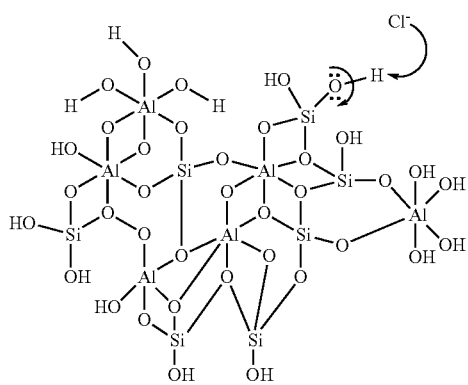

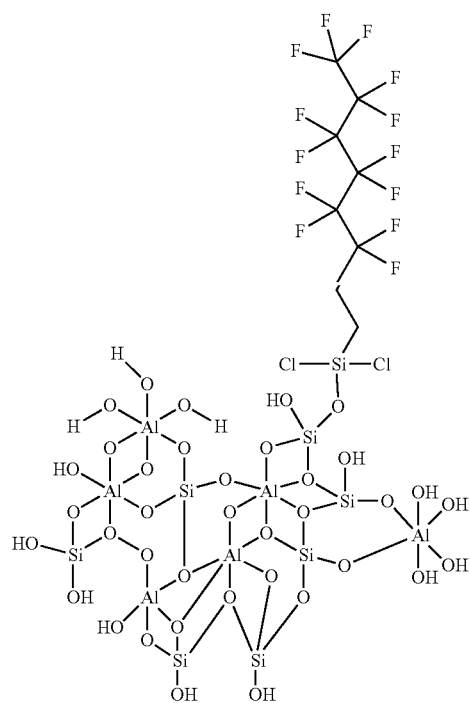
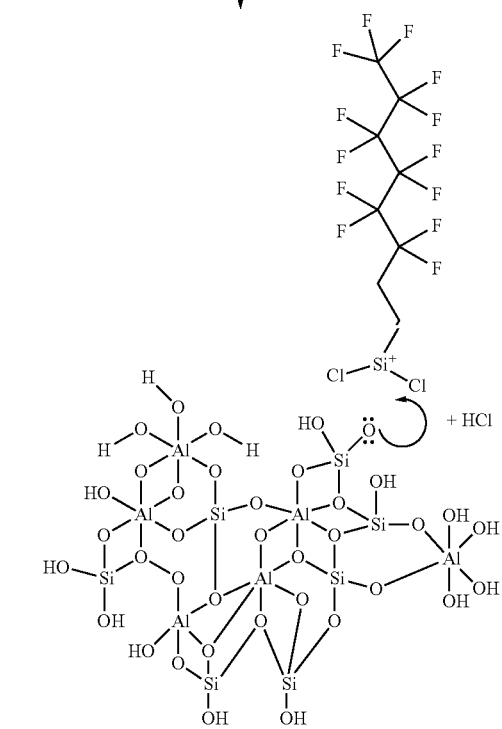

The fluorinated carbon chain is the outer reactive surface of the monolayer, exhibiting hydrophobic and chemical properties associated with the $CF_3$ terminal group. This binding mechanism is consistent with the ATR results (see FIG. 46) and the proposed mechanism of hydrophobicity loss at 400-450° C. depending on the material.

Example 8

Figure 47:
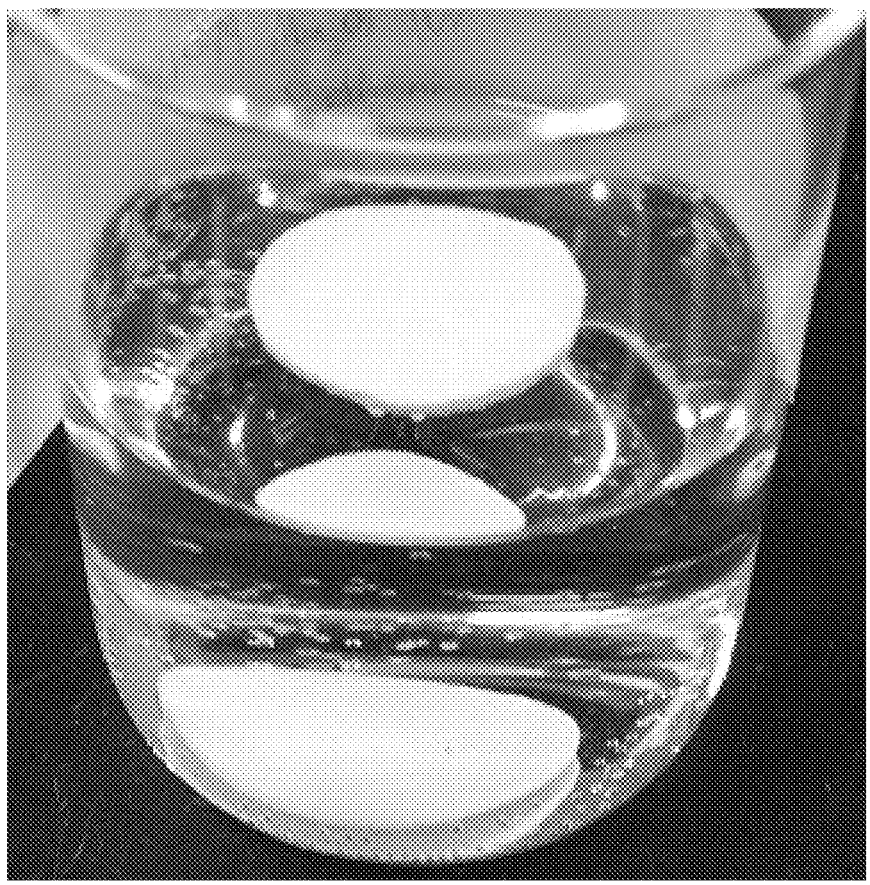
FIG. 47 is an image showing a fluorinated aluminosilicate filter material floating on the water and a control filter comprising untreated, calcined aluminosilicate filter on the bottom of the beaker in water after 5 months establishing that (1) the treated samples are rendered hydrophobic, and (2) that such materials retain their hydrophobicity after prolonged water contact.

Fluorinated aluminosilicates samples were produced by calcining an aluminosilicate substrate at 1000° C. for 4 hours, treating the calcined substrate with a 10 mM PFOTS solution for 30 minutes, rinsing the fluorinated substrate, such as with hexane, and then curing the fluorinated samples at 150° C. for 10 minutes. These materials were then subjected to water immersion tests to assess hydrophobicity. FIG. 47 is an image showing a fluorinated aluminosilicate filter material and a control filter comprising untreated, calcined aluminosilicate filter in water after 5 months establishing that (1) the treated samples are rendered hydrophobic and (2) that such materials retain their hydrophobicity after prolonged water testing.

Example 9

Fluorinated aluminosilicates samples were produced by calcining an aluminosilicate substrate at 1000° C. for 4 hours, treating the calcined substrate with a 10 mM PFOTS solution for 30 minutes, rinsing the fluorinated substrate, such as with hexane, and then curing the fluorinated samples at 150° C. for 10 minutes. These materials were then subjected to acid vapor testing.

Storage of radioisotopes in acidic solutions presents a unique operating challenge to materials near and in contact with waste in SAVY containers. Based on processing knowledge from radiochemistry operations, 25 μL solutions of 6M HCl and 10M HNO₃ were selected as acidic compositions for testing fluorinated aluminosilicate samples. The molarities of the acids were chosen to be extreme, and concentrations are not expected to be this high when venting through the filter. A closed primary container included an open secondary vial containing the acidic solution. A pH indicator strip was placed in each container to verify acidity. Samples were aged in their respective vessels, and contact angles for each sample were taken weekly using a goniometer. Corrosion resistance testing revealed little to no change in the hydrophobicity of PFOTS treated samples as seen through weekly contact angle measurements and observation of the pH strip located in each vessel. The acid in both containers was replenished when no longer seen in the vial in an effort to keep conditions constant throughout the experiment. The results of these acid vapor studies are summarized below in Table 8.

TABLE 8

| Day | Contact Angle for 6 M HCL | Contact Angle for 10 M HNO₃ | Acid Replenished? | PH Appearance |
|---|---|---|---|---|
| 0 | 146 | 136 | — | 0-1 |
| 7 | 140 | 134 | Y | 0-1 |
| 14 | 138 | 138 | Y | 0-1, Bleached |
| 21 | 138 | 136 | N | 0-1, Bleached |
| 28 | 140 | 124 | N | 0-1, Bleached |
| 35 | 134 | 138 | N | 0-1, Bleached |
| 42 | 140 | 138 | Y | 0-1, Bleached |
| 49 | 148 | 140 | N | 0-1, Bleached |
| 56 | 132 | 130 | N | 0-1, Bleached |
| 63 | 144 | 132 | Y | 0-1, Bleached |
| 70 | 131 | 134 | N | 0-1, Bleached |
| 77 | 137 | 132 | N | 0-1, Bleached |
| 84 | 142 | 150 | Y | 0-1, Bleached |
| 91 | 130 | 131 | N | 0-1, Bleached |
| 98 | 131 | 134 | N | 0-1, Bleached |
| 105 | 132 | 129 | N | 0-1, Bleached |
| 112 | 132 | 134 | Y | 0-1, Bleached |
| 119 | 138 | 141 | N | 0-1, Bleached |
| 126 | 138 | 140 | Y | 0-1, Bleached |
| 133 | 139 | 136 | N | 0-1, Bleached |
| 140 | 139 | 134 | Y | 0-1, Bleached |

Contact angles of both samples remained above 120°, indicating continued hydrophobicity after exposure to these extreme acidic environments. The pH strip within each container initially changed to a color characteristic of pH 1, then changed to a color no longer seen on the provided key, indicated by a value of 0 (Table 8). Both strips were replaced each week to verify acidity within the containers. After week 2, the strips began to completely bleach.

Example 10

Filters used in close proximity to radioactive material will be exposed to a cumulative dose of alpha, beta, and gamma ionizing radiation. Conventional filter assemblies with PTFE membranes were compared to PFOTS-treated aluminosilicate filters at Sandia National Laboratory's Gamma Irradiation Facility (GIF). Fluorinated aluminosilicates samples were produced by calcining an aluminosilicate substrate at 1000° C. for 4 hours, treating the calcined substrate with a 10 mM PFOTS solution for 30 minutes, rinsing the fluorinated substrate, such as with hexane, and then curing the fluorinated samples at 150° C. for 10 minutes. Four assembled SAVY lids were then exposed to a ⁶⁰Co source and received a range of gamma radiation doses comprising filter materials for 72 hours while at room temperature, 70° C., 160° C., and 210° C. Doses were continuous throughout the testing. The four samples were exposed to large cumulative doses of gamma radiation after four rounds of beam time, totaling 10.31 Mrad, 6.22 Mrad, 4.94 Mrad, and 4.47 Mrad, respectively. Both PTFE and PFOTS samples passed a 1 minute, 12 inch water column test for the room temperature, 70° C., and 160° C. tests. PTFE samples showed significant damage and failed the water column test after the 210° C. heat treatment whereas the PFOTS samples continued to pass water column tests. As shown in Table 9, the filter performance of the PFOTS samples were recorded before and after the gamma exposure.

TABLE 9

| Sample | Pre-GIF Percent Penetration | Post-GIF Percent Penetration | Pre-GIF Pressure Drop (in WC) | Post-GIF Pressure Drop (in WC) |
|---|---|---|---|---|
| Fixture A | 0.0007 | 0.0008 | 0.548 | 0.54 |
| Fixture B | 0.0004 | 0.0003 | 0.604 | 0.607 |
| Fixture C | 0.0001 | 0.001 | 0.545 | 0.584 |
| Fixture D | 0.0005 | 0.0003 | 0.556 | 0.558 |

Example 11

In addition to testing in a gamma radiation environment, PFOTS-treated aluminosilicate samples were exposed to an alpha beam-line at LANL. Samples A and B were subjected to $5.0 \times 10^{13}$ and $1.0 \times 10^{14}$ particles per cm² total dose, respectively. Contact angles were taken on exposed and unexposed surfaces. ATR-IR was also used to view any possible damage from the alpha beam exposure. Two additional samples were irradiated at $2.0 \times 10^{14}$ particles per cm² total dose. Contact angles of irradiated and unexposed areas of PFOTS-treated filters were taken on samples A through D. As shown by Table 10, contact angles remained relatively similar between the two regions of the filter. All samples tested remained hydrophobic after exposure to an alpha beam.

TABLE 10

| Sample | CA irradiated | CA unexposed |
|---|---|---|
| A | 146 | 150 |
| B | 140 | 150 |
| C | 124 | 131 |
| D | 136 | 128 |

Example 12

The 475° C. failure temperature for PFOTS-treated materials may be limited by the carbon backbone of the fluorinating agent. An inorganic fluorinating agent, ammonium fluoride, can be used to treat suitable filter substrates, such as aluminosilicates. Again without being bound by a theory of operation, treating with ammonium fluoride may create $AlF_4$ structures on the surface of the aluminosilicate substrate, which may provide higher failure temperatures.

An aluminosilicate substrate may be placed into an aqueous ammonium fluoride solution (e.g. 5.4 mM solution) at ambient temperature for about 3 hours. The excess solution is then evaporated from the sample. Alternatively, the sample may be placed into an aqueous ammonium fluoride solution that is 5.5 weight percent fluoride for about 70 hours, to achieve a higher level of fluorination of the substrate. The samples may be calcined or not calcined prior to fluorination. Other solvents may be used for the ammonium fluoride solution, including non-aqueous solvents, such as alkyl alcohols.

Fluorine levels on the aluminosilicate substrate, when treated as described above and according to the procedures described by Schlup et al., *J. Catalysis* 99, 304-315 (1986), would be between about 1% by weight and about 10% by weight, or have an average surface concentration of between about 1.0 and 5.0 F/nm$^2$.

In summary, new compositions have been prepared to provide filter materials that are hydrophobic in the temperature range of 400-485° C. These materials exhibit contact angles in the range of 120-146°, and some have high water affinities as evidenced by high water drop roll off angles. Useful materials include fibrous aluminosilicate filters that were treated multiple times with the PFOTS fluorinating agent. These processes produce filter materials with contact angles of 125° and above, and water drop roll off angles of a few degrees. All treated aluminosilicate filters deterred water ingress under 6 and 12 inch water columns. These materials offer alternatives to conventional SAVY storage container filter materials in terms of failure temperatures (170° C. versus, greater than 400° C. up to at least 480° C.).

Example 13

Polyimide films and polymers are thermally, chemically, and mechanically robust materials. Easily synthesized and applied to surfaces, soluble polyamic acid intermediate (PAA) allows flexibility in manufacturing and production processes before being heat treated to complete an imidization reaction into the final polymer system. Additionally, manipulation of chemical moieties and structures within the polymer system can yield a variety of desired effects, including increased thermal stability as well as hydrophobic interactions.

This example concerns coating inorganic filter materials, such as exemplary embodiments of disclosed inorganic filter materials, including aluminosilicate Fiberfrax gaskets, with a polyimide polymer. The polyimide polymer improves physical properties, such as mechanical, thermal, and chemical stabilities, as well providing improved hydrophobicity for use as filter materials, such as in SAVY™-4000 container applications. Treating the sealing surfaces of the Fiberfrax filters with a polyimide polymer could provide more efficient seals by decreasing the filter porosity at the point of the metal edge seal in the SAVY™-4000 container lid. Polyimide-coated Fiberfrax also could be used to replace silicone and viton gaskets in a wide variety of applications that require more heat resistant and durable gaskets.

Example 14

Three calcined 972-JH filters were submerged in 10 mM PFOTS for 30 minutes, rinsed with hexane, cured at 150° C. for 10 minutes and then stacked smooth side down into a SAVY-4000™ can lid. The filters were covered with a metal plate with holes, a ceramic spacer was placed on top of that, and all were locked into place using a snap ring. This assembly was placed in a muffle furnace and heated to 450° C. for 2 hours. The filters were then tested for hydrophobicity using contact angle measurement.

The results of this example are provided below in Table 11. Filters that had surfaces touching the metal holder had lower contact angles (108-110 degrees) than those that did not (124-133 degrees). The smooth side of the filters had lower standard deviations than the rougher surfaces except for the bottom filter where the smooth surface was touching the metal holder. This is probably because the PFOTS may have decomposed or combusted by the hot metal where the metal touched the surface of the filter.

TABLE 11

Contact Angle of Filters Heated in a SAVY Lid For 2 Hours at 450° C. (loaded in holder smooth side down)

| | Top | | | Middle | | | Bottom | |
| --- | --- | --- | --- | --- | --- | --- | --- | --- |
| | Smooth | Rough | | Smooth | Rough | | Smooth | Rough |
| Average | 130 | 110 | Average | 133 | 130 | Average | 108 | 124 |
| Std dev | 6.0 | 11.5 | Std dev | 4.7 | 13.1 | Std dev | 13.1 | 6.3 |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A porous material configured for use as a filter material in a nuclear material storage container, the porous material comprising an aluminosilicate substrate and a coating having a thickness of greater than zero to 5 microns, the coating comprising a copper oxide coating, a copper oxide nanowire coating, a fluorine coating, a fluoride coating, or combinations thereof.

2. A porous material configured for use as a filter material in a nuclear material storage container, the porous material comprising a substrate material selected from copper, copper oxide, copper nanowires, aluminosilicates, and combinations thereof, and a polyimide coating, wherein the porous material has a water contact angle of 100° to 160° and a failure temperature of from 400° C. to 500° C.

3. A nuclear material storage container, comprising:
a containment device that defines a filter material receptacle; and
a hydrophobic porous filter material housed in the receptacle, wherein the porous filter material comprises a fluorinated aluminosilicate substrate and a coating having a thickness of greater than zero to 5 microns, the coating comprising a copper oxide coating, a copper oxide nanowire coating, a fluorine coating, a fluoride coating, or combinations thereof, the porous filter material having a water contact angle of 100° to 160° and a failure temperature of from 400° C. to 500° C.

4. A method, comprising:
providing a porous material according to claim 1; and
using the material in a process for storing and/or transporting hazardous material.

5. A porous material configured for use as a filter material in a nuclear material storage container, the porous material comprising a substrate material comprising a fluorinated metal, fluorinated metal oxide, fluorinated metal silicate, or combinations thereof, and a polyimide coating.

6. A method, comprising:
providing a porous material according to claim 5; and
using the material in a process for storing and/or transporting hazardous material.

7. A method, comprising:
providing a nuclear material storage container according to claim 3; and
using the nuclear material storage container for storing and/or transporting hazardous material.

* * * * *